United States Patent [19]
Sakai et al.

[11] Patent Number: 5,859,899
[45] Date of Patent: Jan. 12, 1999

[54] METHOD AND SYSTEM FOR DATA COLLECTION USING PUBLIC NETWORK AND BROADCASTING

[75] Inventors: Kazuo Sakai; Tatsuo Suzuki; Katsumi Kishida, all of Kanagawaken; Seishi Tsukada, Fukuokakan, all of Japan

[73] Assignee: Nippon Telegraph and Telephone Corporation, Tokyo, Japan

[21] Appl. No.: 554,314

[22] Filed: Nov. 8, 1995

[30] Foreign Application Priority Data

Nov. 9, 1994 [JP] Japan .................................. 6-275301

[51] Int. Cl.⁶ ................................................ H04M 11/00
[52] U.S. Cl. .................................. 379/92.01; 379/92.04; 379/106.01; 379/113; 379/133; 379/92.03
[58] Field of Search ............................... 379/90, 92, 105, 379/113, 133, 134, 138, 209, 221, 265, 266, 309, 139, 92.01, 92.02, 92.03, 92.04, 106.01, 90.01; 348/1, 2; 455/2

[56] References Cited

U.S. PATENT DOCUMENTS

| | | |
|---|---|---|
| 4,696,029 | 9/1987 | Cohen . |
| 4,931,941 | 6/1990 | Krishnan .................................. 379/220 |
| 5,081,680 | 1/1992 | Bennett ....................................... 379/92 |
| 5,270,809 | 12/1993 | Gammie et al. ........................... 379/92 |
| 5,295,183 | 3/1994 | Langlois et al. ......................... 379/113 |
| 5,410,589 | 4/1995 | Galligan .................................. 379/139 |
| 5,479,492 | 12/1995 | Hofstee et al. ............................ 379/92 |
| 5,553,133 | 9/1996 | Perkins ....................................... 379/92 |

FOREIGN PATENT DOCUMENTS

| | | |
|---|---|---|
| 4-38023 | 2/1992 | Japan . |
| 4-79527 | 3/1992 | Japan . |
| 4-373325 | 12/1992 | Japan . |
| 4-373328 | 12/1992 | Japan . |

*Primary Examiner*—Stella Woo
*Attorney, Agent, or Firm*—Banner & Witcoff Ltd

[57] ABSTRACT

A data collection scheme with an improved data collection efficiency. In order to collect data from many terminals to a center having a plurality of center service ports through a public network, terminal data are transmitted from the terminals to the center through the public network by carrying out a calling operation to call up the center at each terminal, and the terminal data received at the center service ports are collected together. At the same time, a congestion state of the center service ports is measured, and a control data for controlling the calling operation at each terminal in order to improve the measured congestion state is generated and broadcast from the center to the terminals. Then, the calling operation at each terminal is controlled according to the control data broadcast from the center. The control data indicates at least a call probability by which the calling operation at each terminal is carried out probabilistically.

50 Claims, 17 Drawing Sheets

METHOD AND SYSTEM FOR DATA COLLECTION USING PUBLIC NETWORK AND BROADCASTING

BACKGROUND OF THE INVENTION

1. Field of the Invention

The present invention relates to a data collection scheme, and more particularly, to a method and a system for collecting data from unspecified number of many terminals to a center through a public network efficiently, by fully utilizing a processing capacity of center service ports, without exerting unnecessary processing load on the public network.

2. Description of the Background Art

A conventional data collection system has a schematic configuration as shown in FIG. 1, which comprises a center 10, a plurality of terminals 20, and a public network 30 by which the center 10 and the terminals 20 are connected. The center 10 receives data from individual terminals 20, and collects these data together as a collected data. The terminals $20_1$ to $20_n$ transmit the data to the center 10 through the public network 30.

Here, the center 10 has an internal configuration as shown in FIG. 2, which comprises a plurality of data reception units 11, a data collection unit 12 connected with the data reception units 11, and a collected data transmission unit 13 connected with the data collection unit 12. The data reception units $11_1$ to $11_n$ receive data arriving from the individual terminals 20 through the public network 30. The data collection unit 12 collects the data obtained by the data reception units $11_1$ to $11_n$ together. The collected data transmission unit 13 transmits the collected data obtained by the data collection unit 12.

On the other hand, each terminal 20 has an internal configuration as shown in FIG. 3, which comprises a terminal data input unit 21, a terminal data storage unit 22 connected with the terminal data input unit 21, a terminal data transmission unit 23 connected with the terminal data storage unit 22 and a communication line of the public network 30, a busy line handling unit 24 connected with the communication line connected to the terminal data transmission unit 23, and a calling operation command unit 25 connected with the terminal data storage unit 22, the terminal data transmission unit 23, and the busy line handling unit 24.

The terminal data input unit 21 enters data into the terminal 20. The terminal data storage unit 22 stores the data entered from the terminal data input unit 21 until the transmission of the data is completed. The terminal data transmission unit 23 calls up the center 10 through the public network 30, and transmits the data stored in the terminal data storage unit 22. The busy line handling unit 24 judges whether the line is connected as a result of the calling from the terminal data transmission unit 23, and controls the calling operation command unit 25 to repeat the calling operation when the line is busy. The calling operation command unit 25 activates the calling operation at the terminal data transmission unit 23.

In this configuration of FIG. 3, the data entered from the terminal data input unit 21 is stored in the terminal data storage unit 22. When the storing of the data to be transmitted is completed, the terminal data storage unit 22 notifies the calling operation command unit 25 that the data is ready for transmission, and await for a timing to supply the data to the terminal data transmission unit 23. The calling operation command unit 25 issues a command for calling to the terminal data transmission unit 23 when a timing for calling is given. When this call command is received from the calling operation command unit 25, the terminal data transmission unit 23 calls up the center 10 through the public network 30, and when the line is successfully connected, the terminal data transmission unit 23 reads out the data stored in the terminal data storage unit 22 and transmits the data to the center 10 through the public network 30. The busy lie handling unit 24 monitors a state of the communication line connected to the terminal data transmission unit 23, and when a busy line state is detected in response to the calling from the terminal data transmission unit 23, the busy line handing unit 24 notifies a need of re-calling to the calling operation command unit 25.

In this terminal 20 of FIG. 3, the calling operation command unit 25 and the busy line handling unit 24 have internal configurations as shown in FIG. 4, where the calling operation command unit 25 has a wait time determination unit 251 for determining a wait time until the calling, while the busy line handling unit 24 has a busy state detection unit 241 for checking whether the communication line is in a busy state or not in response to the calling, and a re-calling command unit 242 for notifying a need of re-calling due to the busy line to the calling operation command unit 25.

When a notice from the terminal data storage unit 22 indicating that the data is ready for transmission is received, the wait time determination unit 251 of the calling operation command unit 25 determines an appropriate time interval, and issues the call command to the terminal data transmission unit 23 after awaiting for the determined time interval. Subsequently, when the busy state detection unit 241 of the busy line handling unit 24 detects the communication line in the busy state, and a notice from the re-calling command unit 242 of the busy line handling unit 24 indicating the need of re-calling is received, the wait time determination unit 251 of the calling operation command unit 25 determines an appropriate time interval again, and issues the call command to the terminal data transmission unit 23 again after awaiting for the determined time interval.

In this conventional data collection system, the center 10 does not have a list of addresses of individual terminals 20, so that the center 10 cannot collect the terminal data by the polling from the center 10 side in a case of collecting unspecified number of many terminal data, and it is necessary for each terminal 20 to call up the center 10 through the public network 30. However, conventionally, there has been no way of notifying how busy the center 10 is to unspecified number of many terminals, so that each terminal 20 calls up the center 10 through the public network 30 according to its own convenience, totally unsystematically.

Now, when many terminals call up the center in excess to a processing capacity of the center service ports, it becomes necessary for the network to carry out the call loss processing with respect to the overflowing calls, so that a processing load due to a processing which is not directly related to the data transmission and reception will be exerted on the network.

For this reason, each terminal 20 has a locally predetermined wait time interval, such that the calling operation is repeated at this wait time interval until the call is connected. However, in this conventional scheme, it is necessary for each terminal 20 to have a locally predetermined wait time interval, and besides, each local terminal 20 cannot know a total number of terminals which are potentially trying to call up the center 10, so that it is difficult to control a total number of calls which are simultaneously made from a number of terminals 20 to a level close to a processing capacity of the center service ports. In other words, it is difficult to control this total number of calls at a level which can fully utilize the processing capacity of the center service ports while not exerting any extra processing load on the network.

On the other hand, unless the center service ports are operated near their processing capacity limit, the data collection time becomes long. On the contrary, when the processing capacity of the center service ports is exceeded considerably to exert the extra processing load to the network, it becomes impossible for the network to concentrate on the connection processing related to the data collection, and for this reason the data collection time also becomes long.

SUMMARY OF THE INVENTION

It is therefore an object of the present invention to provide a method and a system for data collection capable of minimizing a need of a call loss processing at the network, while fully utilizing the processing capacity of the center service ports.

It is another object of the present invention to provide a method and a system for data collection capable of improving a data collection efficiency by fully utilizing the processing capacity of the center service ports.

It is another object of the present invention to provide a method and a system for data collection capable of comprehending a congestion state at the center, and improving the congestion state at the center.

It is another object of the present invention to provide a method and a system for data collection capable of counting a number of lost calls overflowing at the center service ports, predicting a total number of terminals which are potentially trying to call the center, and controlling the calling operations at the terminals according to the prediction.

It is another object of the present invention to provide a method and a system for data collection capable of adaptively controlling the calling operations at the terminals in consideration of factors such as a time for which the center service port is occupied by each call from each terminal, and a time lag between the calling operation at the terminal and the actual call arrival at the center.

According to one aspect of the present invention there is provided a method for collecting data from many terminals to a center having a plurality of center service ports through a public network, the method comprising the steps of: transmitting terminal data from the terminals to the center through the public network by carrying out a calling operation to call up the center at each terminal; collecting the terminal data received at the center service ports; measuring a congestion state of the center service ports; generating a control data for controlling the calling operation at each terminal such that the congestion state measured at the measuring step is improved; broadcasting the control data generated at the generating step from the center to the terminals; and controlling the calling operation at each terminal according to the control data broadcast at the broadcasting step.

According to another aspect of the present invention there is provided a system for collecting data from many terminals to a center having a plurality of center service ports through a public network, the system comprising: means for transmitting terminal data from the terminals to the center through the public network by carrying out a calling operation to call up the center at each terminal; means for collecting the terminal data received at the center service ports; means for measuring a congestion state of the center service ports; means for generating a control data for controlling the calling operation at each terminal such that the congestion state measured by the measuring means is improved; means for broadcasting the control data generated by the generating means from the center to the terminals; and means for controlling the calling operation at each terminal according to the control data broadcast by the broadcasting means.

According to another aspect of the present invention there is provided a terminal device in a system for collecting data from many terminals to a center having a plurality of center service ports through a public network, the terminal device comprising: control data receiving means for receiving a control data for controlling a calling operation to call up the center at the terminal device broadcast from the center; calling operation control means for determining whether or not to carry out the calling operation according to the control data received by the control data receiving means; data transmission means for transmitting terminal data through the public network to one of the center service ports by carrying out the calling operation when the calling operation control means determines to carry out the calling operation; and busy line handling means for restarting a probabilistic execution of the calling operation by restarting a reception of the call probability at the control data receiving means when a call made by the calling operation resulted in a busy state.

According to another aspect of the present invention there is provided a terminal device in a system for collecting data from many terminals to a center having a plurality of center service ports through a public network, the terminal device comprising: control data receiving means for receiving a control data for controlling a calling operation to call up the center at the terminal device broadcast from the center; calling operation control means for determining whether or not to carry out the calling operation according to the call probability received by the control data receiving means; data transmission means for transmitting terminal data through the public network to one of the center service ports by carrying out the calling operation when the calling operation control means determines to carry out the calling operation; and busy line handling means for restarting a probabilistic execution of the calling operation by restarting a reception of the call probability at the control data receiving means, while requesting the public network to count a number of lost calls overflowing at the center service ports, when a call made by the calling operation resulted in a busy state.

According to another aspect of the present invention there is provided a center device in a system for collecting data from many terminals to a center having a plurality of center service ports through a public network, the center device comprising: data reception means for receiving terminal data from the terminals in response to arrivals of calls from the terminals to the center service ports; data collection means for collecting the terminal data received by the data reception means; congestion state measurement means for measuring a congestion state of the center service ports; control data generation means for generating a control data for controlling a calling operation at each terminal such that the congestion state measured by the congestion state measurement means is improved; and control data broadcast means for broadcasting the control data generated by the control data generation means to the terminals.

According to another aspect of the present invention there is provided a center device in a system for collecting data from many terminals to a center having a plurality of center service ports through a public network, the center device comprising: data reception means for receiving terminal data from the terminals in response to arrivals of calls from the terminals to the center service ports; data collection means for collecting the terminal data received by the data reception means; congestion state measurement means for measuring a congestion state of the center service ports, and obtaining a number of lost calls overflowing from the center service ports from the public network; control data generation means for generating a control data for controlling a calling operation at each terminal such that the congestion state measured by the congestion state measurement means is improved while the number of lost calls obtained by the congestion state measurement means is reduced; and control data broadcast means for broadcasting the control data generated by the control data generation means to the terminals.

Other features and advantages of the present invention will become apparent from the following description taken in conjunction with the accompanying drawings.

DETAILED DESCRIPTION OF THE PREFERRED EMBODIMENTS

Referring now to FIG. 5 to FIG. 12, the first embodiment of a method and a system for data collection according to the present invention will be described in detail.

Figure 1:
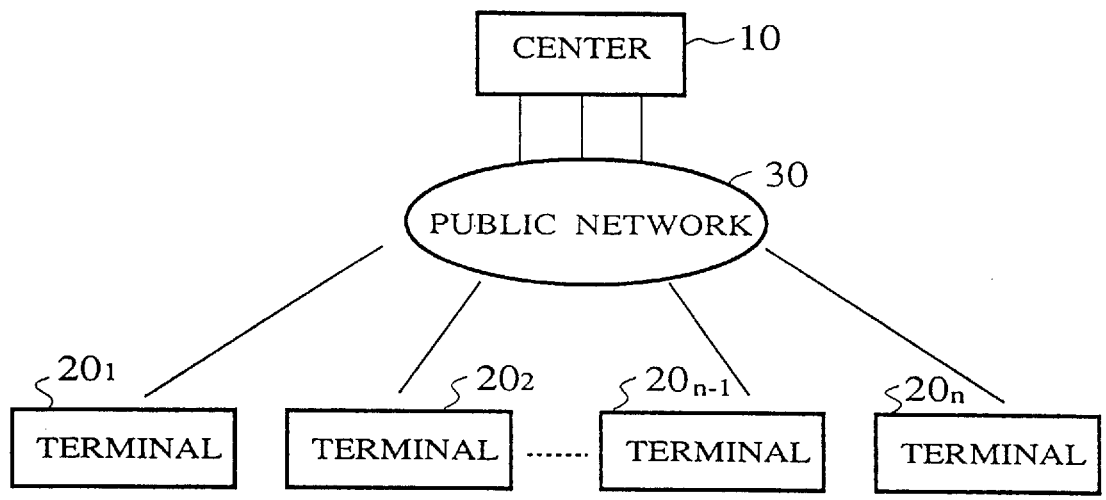
FIG. 1 is a schematic block diagram of a conventional data collection system.
Figure 2:
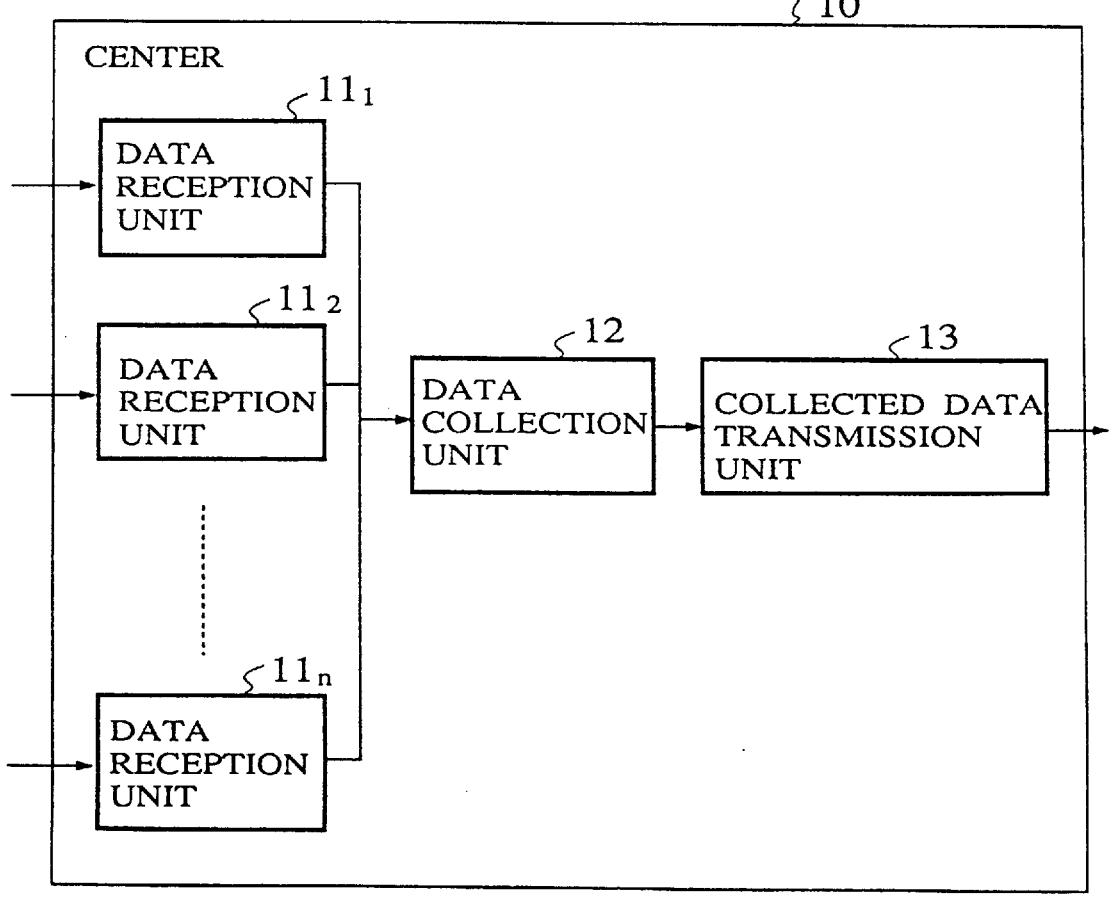
FIG. 2 is a block diagram of a center in the conventional data collection system of FIG. 1.
Figure 3:
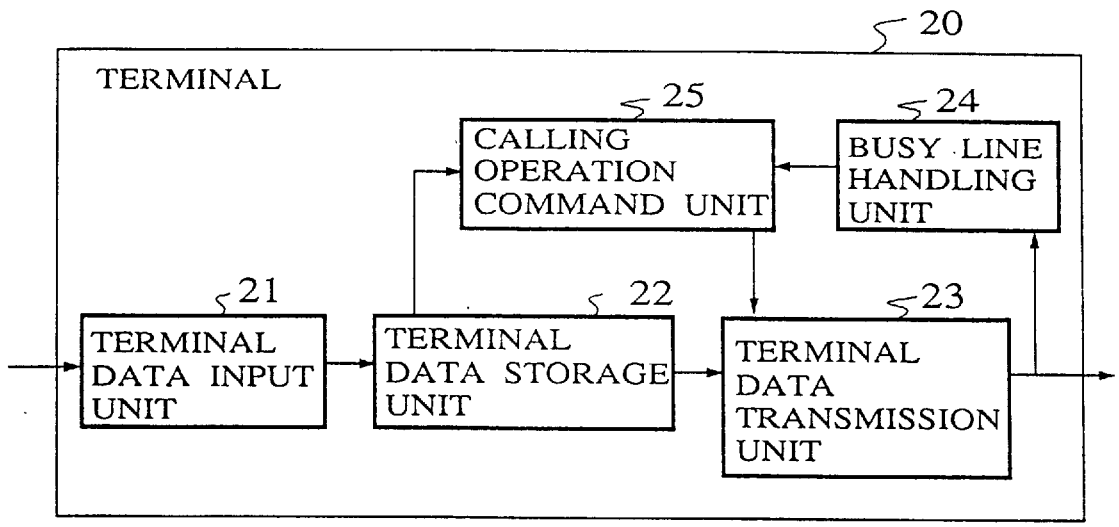
FIG. 3 is a block diagram of a terminal in the conventional data collection system of FIG. 1.
Figure 4:
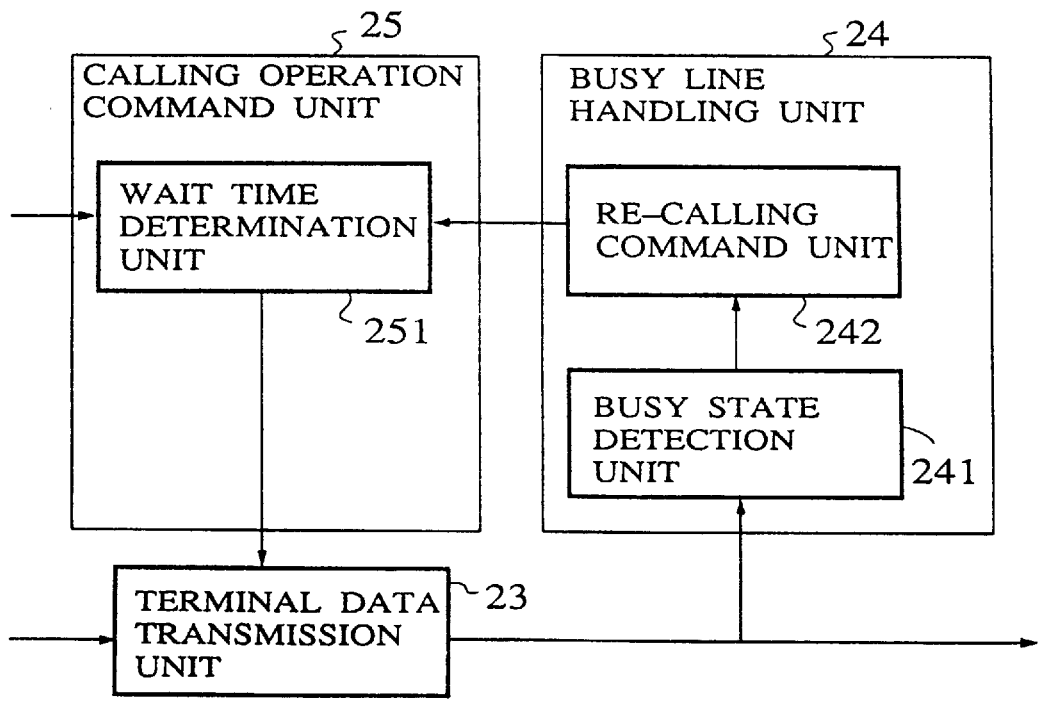
FIG. 4 is a detailed block diagram of a calling operation command unit and a busy line handling unit in the terminal of FIG. 3.
Figure 5:
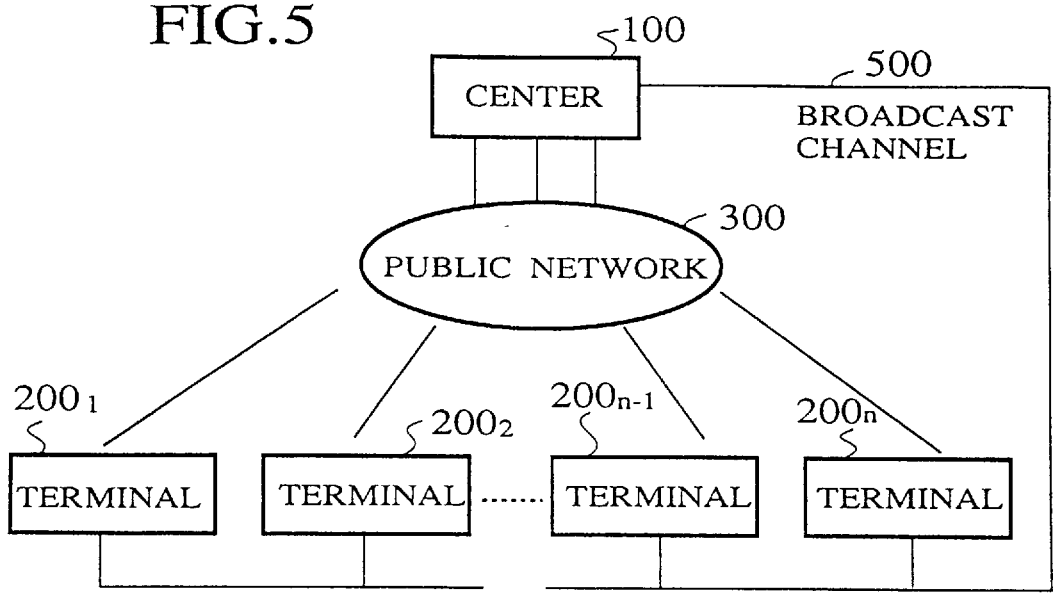
FIG. 5 is a schematic block diagram of the first embodiment of a data collection system according to the present invention.

In this first embodiment, the system has an overall configuration as shown in FIG. 5, which comprises a center 100, a plurality of terminals 200, a public network 300 by which the center 100 and the terminals 200 are connected, and a broadcast channel 500 provided between the center 100 and the terminals 200.

The center 100 receives data from individual terminals 200, and collects these data together as a collected data. The terminals $200_1$ to $200_n$ transmit the data to the center 100 through the public network 300. In addition, the broadcast channel 500 provides a broadcast of control data from the center 100 to the terminals 200. Here, the broadcast channel 500 can be either a wire link or a radio link.

Figure 6:
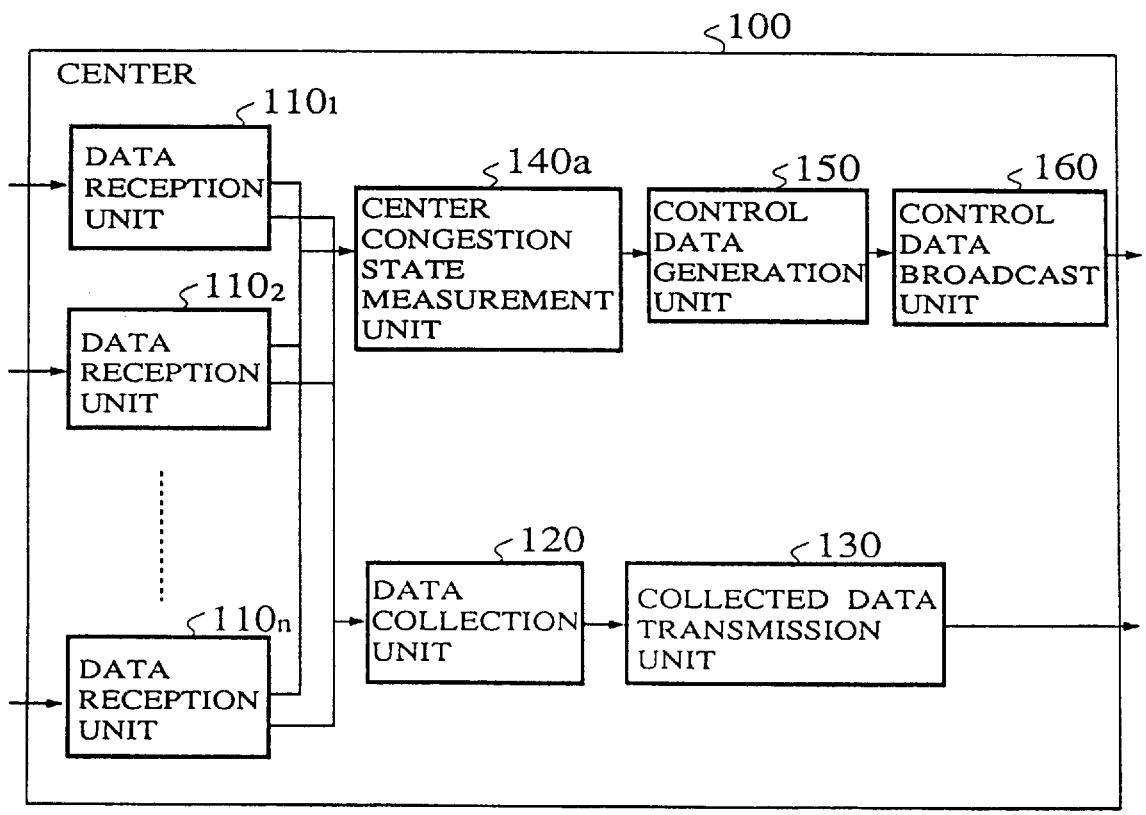
FIG. 6 is a block diagram of a center in the data collection system of FIG. 5.

Here, the center 100 has an internal configuration as shown in FIG. 6, which comprises a plurality of data reception units 110 serving as center service ports connected with the public network 300, a data collection unit 120 connected with the data reception units 110, a collected data transmission unit 130 connected with the data collection unit 120, a center congestion state measurement unit 140a connected with the data reception units 110, a control data generation unit 150 connected with the center congestion state measurement unit 140a, and the control data broadcast unit 160 connected with the control data generation unit 150 and the broadcast channel 500.

The data reception units $110_1$ to $110_n$ receive data arriving from the individual terminals 200 through the public network 300, and enter the received data into the data collection unit 120 while notifying the arrival of the received data to the center congestion state measurement unit 140a. The data collection unit 120 collects the data obtained by the data reception units $110_1$ to $110_n$ together as collected data, and enters the collected data into the collected data transmission unit 130. The collected data transmission unit 130 transmits the collected data obtained by the data collection unit 120 to a destination predetermined in the center 100.

The center congestion state measurement unit 140a measures a center congestion state indicated by a total number of arrived calls at the center 100 according to a number of received calls notified from the data reception units 110. The control data generation unit 150 generates a call probability as the control data according to the center congestion state measured by the center congestion state measurement unit 140a. The control data broadcast unit 160 broadcasts the call probability generated by the control data generation unit 150 as the control data toward an unspecified number of the terminals 200.

In further detail, this center 100 of FIG. 6 operates as follows.

First, when the data reception unit 110 receives the data, the received data is entered into the data collection unit 120 via a path, while a fact that there has been a call arrival is notified to the center congestion state measurement unit 140a via a data bus.

Next, the data collection unit 120 collects the data received at the data reception units 110 into one collected data, and enters that collected data into the collected data transmission unit 130. Then, the collected data transmission unit 130 transmits the entered collected data to a specified destination. Here, the collected data transmission unit 130 is required in a case of transmitting the collected data to a location at which the actual service utilizing the collected data is to be provided which is distanced from the center 100 for collecting the data, but in a case the service utilizing the collected data is to be provided at the same location as the center 100, this collected data transmission unit 130 will be unnecessary.

On the other hand, the control data generation unit 150 determines the call probability according to the number of arrived calls measured by the center congestion state measurement unit 140a, and enters this call probability as the control data into the control data broadcast unit 160. Then, the control data broadcast unit 160 outputs the entered control data to the broadcast channel 500. The terminals 200 receive the control data through this broadcast channel 500.

Figure 7:
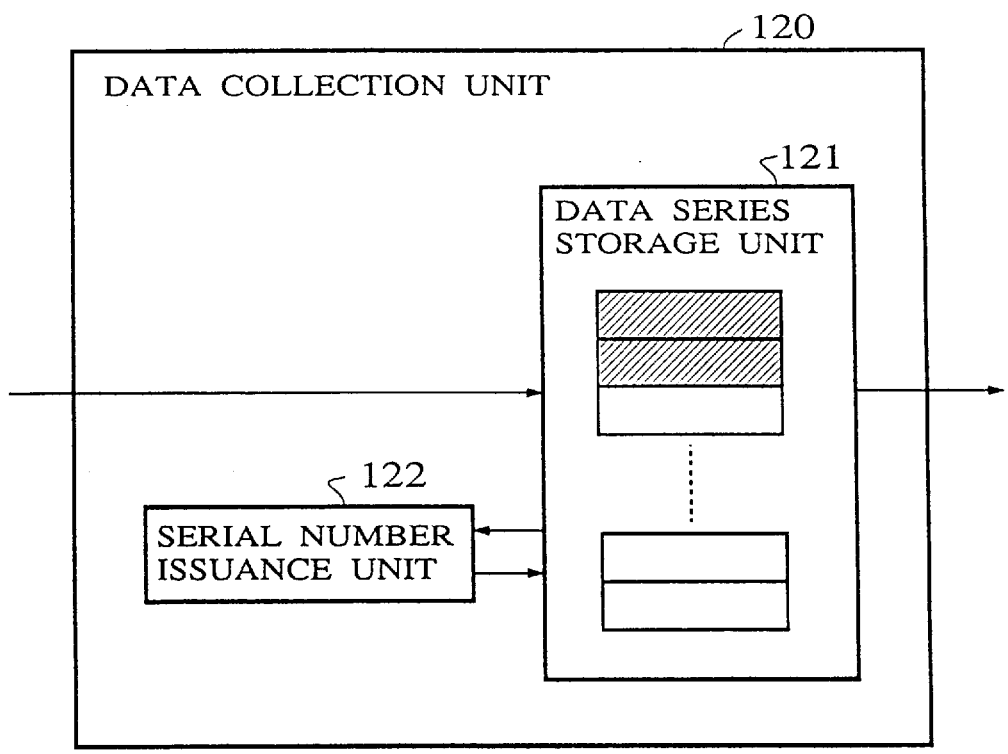
FIG. 7 is a detailed block diagram of a data collection unit in the center of FIG. 6.

In the center 100 of FIG. 6, the data collection unit 120 has an internal configuration as shown in FIG. 7, which includes a data series storage unit 121 and a serial number issuance unit 122. The data series storage unit 121 stores the arrived data as one collected data, The serial number issuance unit 122 assigns a serial number to each data in response to a request from the data series storage unit 121.

In this configuration of FIG. 7, when the data series storage unit 121 receives the data from the data reception unit 110, the issuance of a serial number is requested to the serial number issuance unit 122, and with the issued serial number as an index, the data series storage unit 121 stores the data in an ordered array. The data stored in an array of the data series storage unit 121 are then collectively entered into the collected data transmission unit 130.

Figure 8:
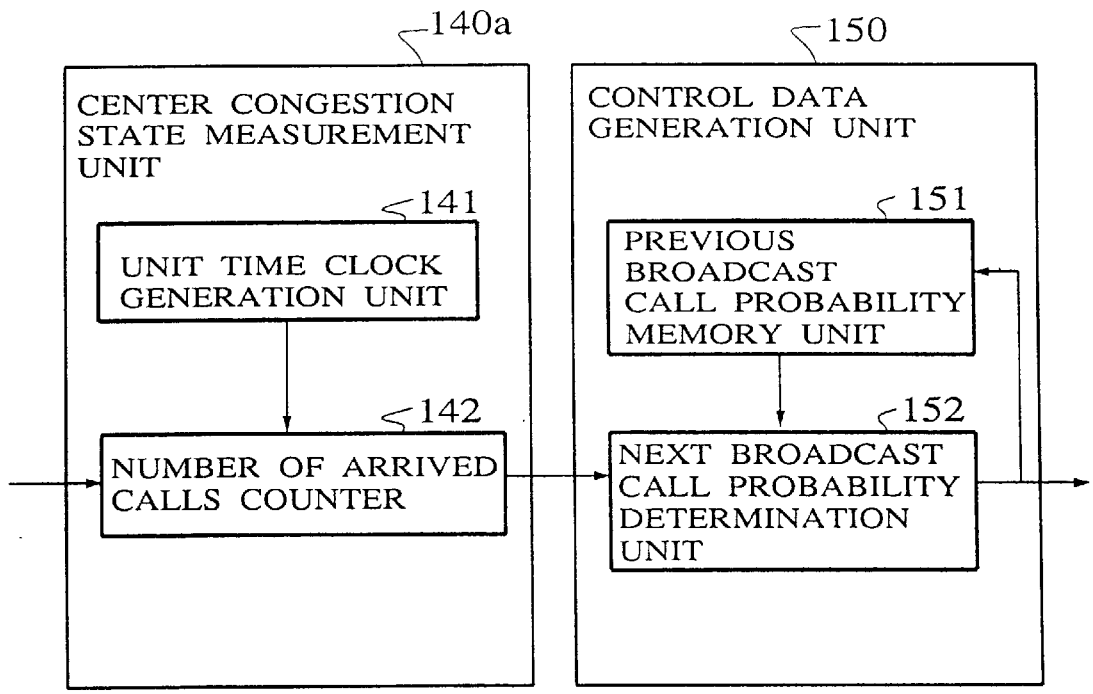
FIG. 8 is a detailed block diagram of a center congestion state measurement unit and a control data generation unit in the center of FIG. 6.

Also, in the center 100 of FIG. 6, the center congestion state measurement unit 140a and the control data generation unit 150 have internal configurations as shown in FIG. 8, where the center congestion state measurement unit 140a includes a unit time clock generation unit 141 for generating a clock signal at a prescribed unit time interval, and a number of arrived calls counter 142 for counting a number of calls arriving from the data reception units 110, while the control data generation unit 150 includes a previous broadcast call probability memory unit 151 for storing the call probability that had been broadcast at a previous unit time interval, and a next broadcast call probability determination unit 152 for determining the call probability to be broadcast at a next unit time interval.

The number of arrived calls counter 142 of the center congestion state measurement unit 140a is incremented whenever an arrival of a call is notified from any of the data reception units 110. Also, when a clock signal indicating an end of a unit time interval is received from the unit time clock generation unit 141, a counter value at that point is notified to the next broadcast call probability determination unit 152 of the control data generation unit 150, and then the counter value is reset.

The next broadcast call probability determination unit 152 of the control data generation unit 150 initially has an initial value of the call probability which is a value sufficiently small such that the arriving calls resulting from this initial value will not exceed the processing capacity of the center service ports. This initial value is used in the initial unit time interval, while the call probability is sequentially updated in the second and subsequent unit time intervals as follows. Here, let a number of arrived calls notified from the number of arrived calls counter 142 be A, a value stored in the previous broadcast call probability memory unit 151 be Pa, and a number of service ports in the center 100 be C.

(1) A case of A=C (a number of arrived calls is equal to a number of center service ports)

In this case, there is a possibility for an occurrence of some call losses, so that the control data generation unit 150 determines an appropriate value D (0<D<1), and obtains the next broadcast call probability P as:

$$P = Pa \times D$$

Here, if A=C in all the unit time intervals prior to this point, it implies that at least as many calls as a number of center service ports have been consistently arriving, so that D=0.5 is used for example, as there is a possibility for the previously used call probability to be quite inappropriate. Otherwise, that is, if A<C in some unit time interval prior to this point, it implies that a number of arrived calls just happened to be equal to a number of center service ports, so that D=0.99 is used for example, as it can be considered that the previously used call probability is not so inappropriate.

(2) A case of A<C (a number of arrived calls is less than a number of center service ports)

In this case, if Pa=1 and A=0, it implies that there is no terminal which is trying to call up the center 100, so that the operation at the center 100 is terminated.

Also, if Pa<1 and A=0, there is a possibility for a case in which a number of arrived calls A just happens to be 0 as the previous broadcast call probability is too small, so that the control data generation unit 150 determines a larger value for the next broadcast call probability P, and the control data broadcast unit 160 broadcasts this next broadcast call probability P as the control data again.

For example, when the previous broadcast call probability is Pa, the next broadcast call probability is determined as P=Pa×2. Here, however, P is a probability value which should not exceed 1, so that when Pa×2 exceeds 1, the next broadcast call probability is determined as P=1.

On the other hand, if A>0, a total number N of the terminals which are potentially trying to call up the center 100 is predicted from the number A of arrived calls and the previous broadcast call probability Pa as:

$$N = (A/Pa) - A$$

Here, the reason for subtracting the number A of arrived calls is that the data collection has already been completed for these A calls which have already arrived. Then, the next broadcast call probability is determined from the number C of center service ports and the predicted number N as:

$$P = C/N$$

Here, however, P is a probability value which should not exceed 1, so that when N<C, the next broadcast call probability is determined as P=1.

The next broadcast call probability P so determined is then stored in the previous broadcast call probability memory unit 151, while being broadcast from the control data broadcast unit 160 as the control data.

Figure 9:
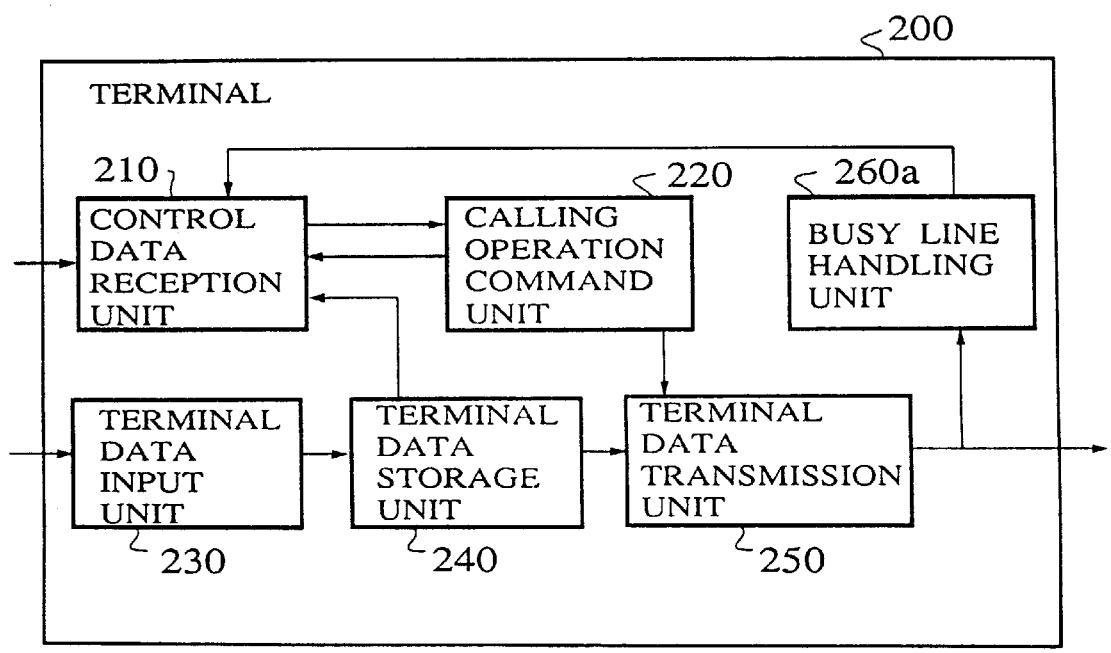
FIG. 9 is a block diagram of a terminal in the data collection system of FIG. 5.

On the other hand, each terminal 200 has an internal configuration as shown in FIG. 9, which comprises a control data reception unit 210 for receiving the control data broadcast from the center 100, a calling operation command unit 220 connected with the control data reception unit 210 for commanding the calling operation, a terminal data input unit 230 for entering terminal data to be transmitted, a terminal data storage unit 240 connected with the terminal data input unit 230 and the control data reception unit 210 for storing the entered terminal data until the transmission of the terminal data is completed, a terminal data transmission unit 250 connected with the calling operation command unit 220, the terminal data storage unit 240 and a communication line of the public network 300 for transmitting the terminal data toward the center 100 through the public network 300, and a busy line handling unit 260a connected with the control data reception unit 210 and the communication line connected to the terminal data transmission unit 250 for handling a case in which the connection to the center 100 fails because of the busy line.

In this configuration of FIG. 9, the terminal data entered from the terminal data input unit 230 is stored in the terminal data storage unit 240. When the storing of the data to be transmitted is completed, the terminal data storage unit 240 commands the control data reception unit 210 to start receiving the control data from the center 100, and await for a timing to supply the data to the terminal data transmission unit 250. When this command from the terminal data storage unit 240 is received, the control data reception unit 210 receives the control data indicating the call probability broadcast from the center 100, and transfer the received call probability to the calling operation command unit 220. Here, once the control data is received, the control data reception unit 210 does not receive any subsequent control data unless the restart of the control data reception is commanded from either the calling operation command unit 220 or the busy line handling unit 260a.

The calling operation command unit 220 determines whether or not to make a call whenever the control data (call probability) is received from the control data reception unit 210. In a case of making a call, the calling operation command unit 220 commands the calling operation to the terminal data transmission unit 250. When this call command is received from the calling operation command unit 220, the terminal data transmission unit 250 calls up the center 100 through the public network 300, and when the line is successfully connected, the terminal data transmission unit 250 reads out the terminal data stored in the terminal data storage unit 240 and transmits the terminal data to the center 100 through the public network 300. On the other hand, in a case of not making a call, the calling operation command unit 220 commands the restart of the control data reception to the control data reception unit 210.

The busy line handling unit 260a monitors a state of the communication line connected to the terminal data transmission unit 250, and when a busy line state is detected in response to the calling from the terminal data transmission unit 250, the busy line handing unit 260a commands the control data reception unit 210 to restart the reception of the control data. In response, when the call probability is transferred from the control data reception unit 210 again, the calling operation command unit 220 recognizes a need of re-calling.

Figure 10:
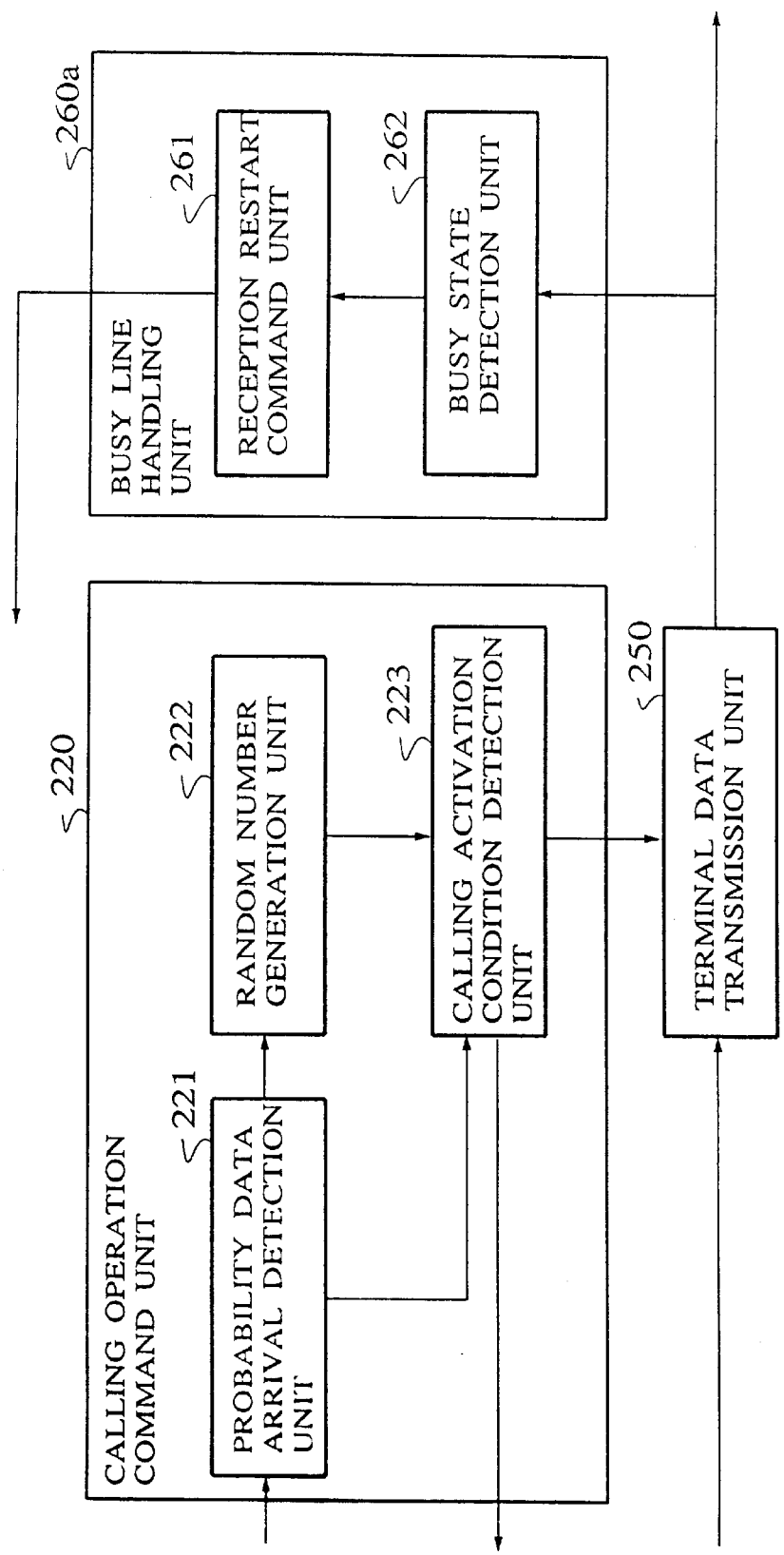
FIG. 10 is a detailed block diagram of a calling operation command unit and a busy line handling unit in the terminal of FIG. 9.

In this terminal 200 of FIG. 9, the calling operation command unit 220 and the busy line handling unit 260a have internal configurations as shown in FIG. 10, where the calling operation command unit 220 has a probability data arrival detection unit 221 connected with the control data reception unit 210, a random number generation unit 222 connected with the probability data arrival detection unit 221, and a calling activation condition detection unit 223 connected with the probability data arrival detection unit 221 and the control data reception unit 210, the random number generation unit 222, and the terminal data transmission unit 250, while the busy line handling unit 260a has a reception restart command unit 261 connected with the control data reception unit 210, and a busy state detection unit 262 connected with the reception restart command unit 261 and the communication line connected to the terminal data transmission unit 250.

When the call probability data from the control data reception unit 210 is received, the probability data arrival detection unit 221 of the calling operation command unit 220 sends a signal to the random number generation unit 222, while supplying the received call probability into the calling activation condition detection unit 223. In response to the signal from the probability data arrival detection unit 221, the random number generation unit 222 generates a random number R in a range of $0.0 < R \leq 1.0$, and enters the generated random number R into the calling activation condition detection unit 223. Then, the calling activation condition detection unit 223 issues the call command to the terminal data transmission unit 250 when the entered random number R is less than or equal to the entered call probability P, i.e., when $R \leq P$. On the other hand, when $R > P$, the calling activation condition detection unit 223 commands the restart of the control data reception to the control data reception unit 210.

The busy state detection unit 262 of the busy line handling unit 260a monitors the communication state in the communication line connected to the terminal data transmission unit 250, and when the communication line in the busy state is detected, notifies this to the reception restart command unit 261. In response, the reception restart command unit 261 commands the control data reception unit 210 to restart the reception of the control data.

Figure 11:
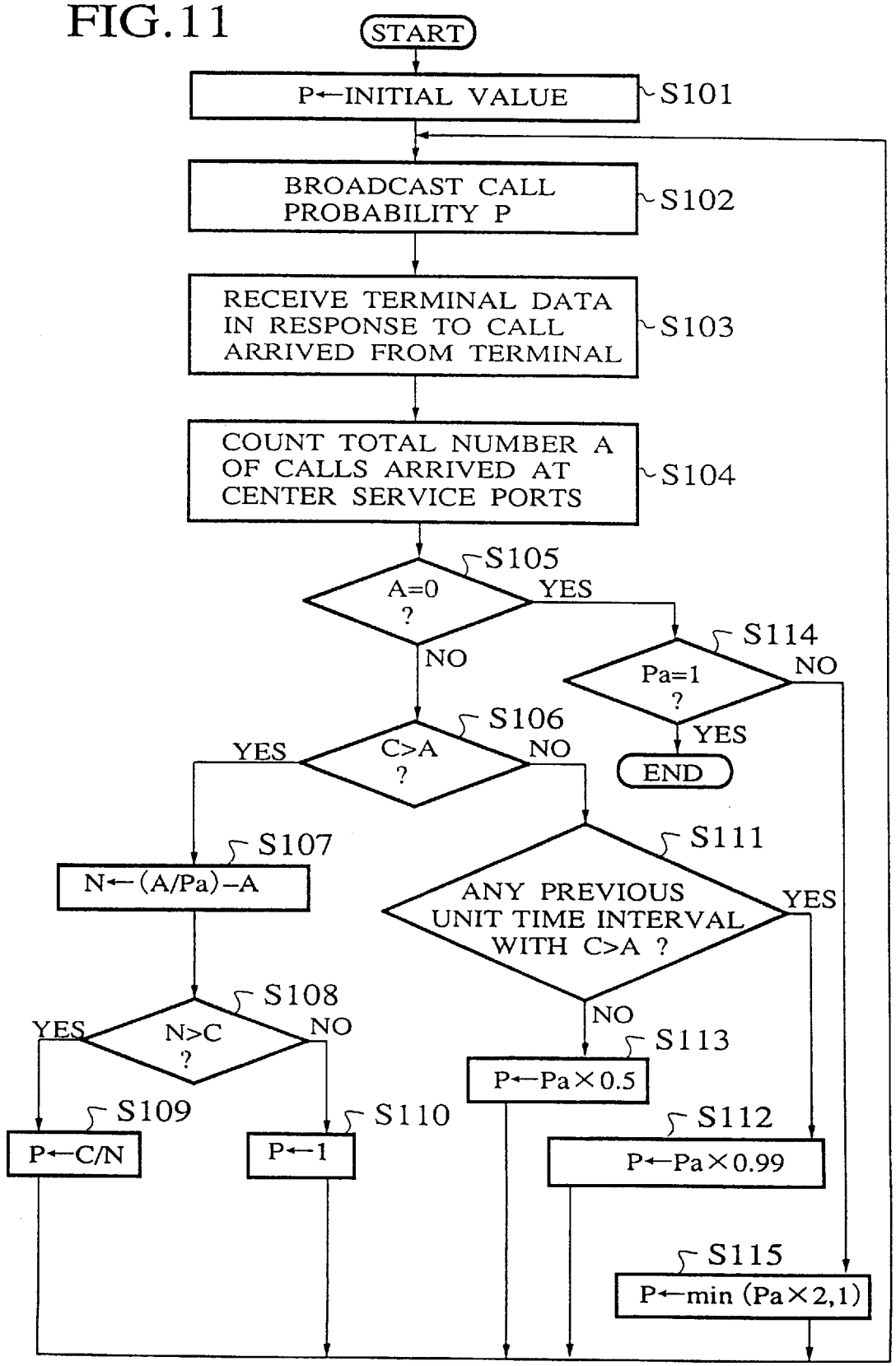
FIG. 11 is a flow chart for a basic operation in the center of FIG. 5.
Figure 12:
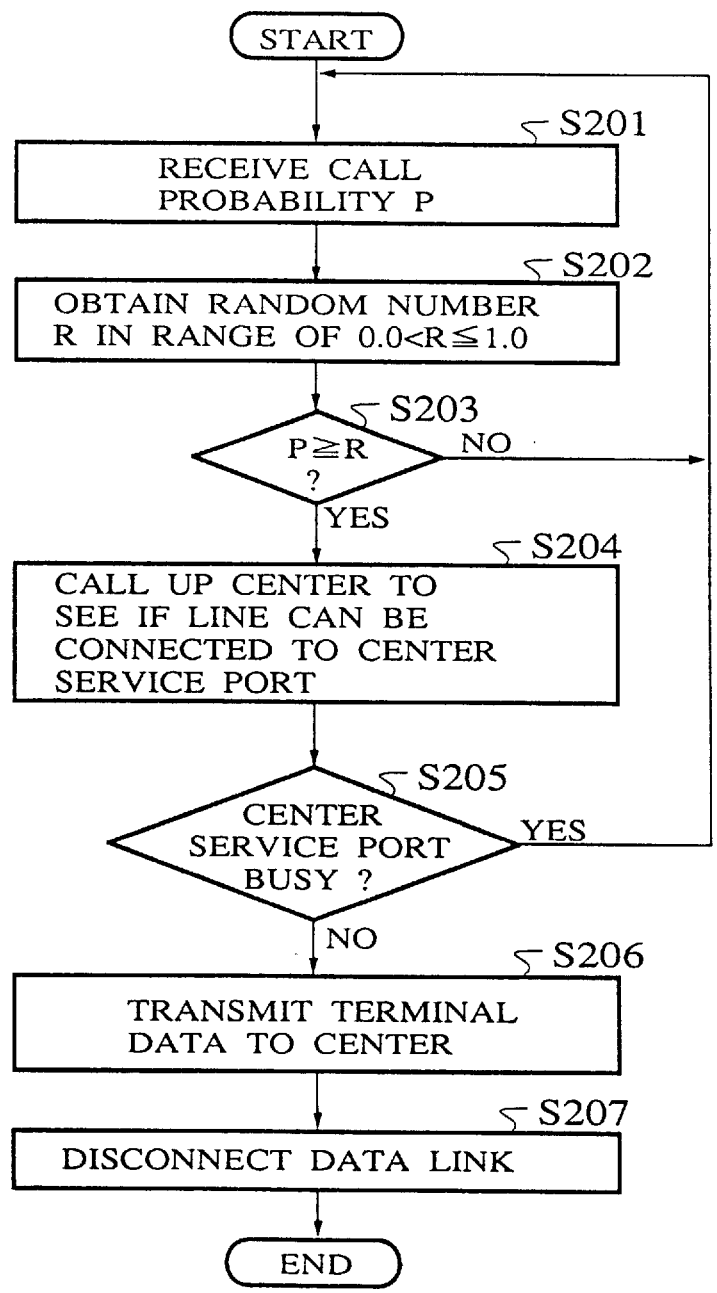
FIG. 12 is a flow chart for a basic operation in the terminal of FIG. 9.

Now, with references to the flow charts of FIG. 11 and FIG. 12, the overall basic operation of the center 100 and each terminal 200 in this first embodiment will be described.

First, the basic operation at the center 100 side is carried out according to the flow chart of FIG. 11 as follows.

The control data generation unit 150 sets up the initial value of the call probability P which is a value sufficiently small such that the arriving calls resulting from this initial value will not exceed the processing capacity of the center service ports for the initial unit time interval at the center 100 (S101).

When this call probability P is transferred from the control data generation unit 150 to the control data broadcast unit 160, the control data broadcast unit 160 broadcasts this call probability P as the control data for the initial unit time interval to the terminals 200 through the broadcast channel 500 (S102).

Then, in response to calls arrived from the terminals 200, the data reception units 110 of the center 100 receive the terminal data (S103).

Also, the number of arrived calls counter 142 of the center congestion state measurement unit 140a counts the total number A of the calls arrived at the center service ports, and enters the counted total number A of arrived calls into the next broadcast call probability determination unit 152 (S104).

Then, the next broadcast call probability determination unit 152 of the control data generation unit 150 judges whether the count value A is equal to 0 or not (S105), and the operation proceeds to the step S106 in a case A≠0, or to the step S114 in a case A=0.

When A≠0, the next broadcast call probability determination unit 152 compares the count value A with the number C of the center service ports (S106), and the operation proceeds to the step S107 in a case C>A, or to the step S111 in a case C≦A.

When C>A, the next broadcast call probability determination unit 152 predicts the total number N of the terminals 200 which are potentially trying to call up the center 100 as:

$$N=(A/Pa)-A$$

where Pa is a previous call probability value stored in the previous broadcast call probability memory unit 151 (S107).

Then, the next broadcast call probability determination unit 152 compares the predicted total terminal number N obtained at the step S107 with the number C of the center service ports (S108), and the operation proceeds to the step S109 in a case N>C, or to the step S110 in a case N<C.

When N>C, the next broadcast call probability determination unit 152 determines the next broadcast call probability P according to the predicted total terminal number N and the number C of the center service ports as P =C/N (S109), and the operation returns to the step S102.

When N≦C, the next broadcast call probability determination unit 152 determines the next broadcast call probability P to be P=1 (S110), and the operation returns to the step S102.

On the other hand, when C≦A at the step S106, whether there is any previous unit time interval for which C>A or not is judged (S111). If yes, the operation proceeds to the step S112, whereas otherwise the operation proceeds to the step S113.

When there is a previous unit time interval for which C>A, it can be considered that the previously used call probability is not so inappropriate, so that the call probability value is slightly reduced, to be 0.99 times the previous broadcast call probability value for example. Thus, the next broadcast call probability P is determined as P=Pa×0.99 (S112), and the operation returns to the step S102.

When there is no previous unit time interval for which C>A, there is a possibility for the previously used call probability to be quite inappropriate, so that the call probability value is reduced to be a half of the previous broadcast call probability value for example. Thus, the next broadcast call probability P is determined as P=Pa×0.5 (S113), and the operation returns to the step S102.

On the other hand, when A=0 at the step S105, that is when there is no arrived call, whether the previous broadcast call probability Pa is equal to 1 or not is judged (S114). If Pa=1, the operation is terminated, whereas otherwise the operation proceeds to the step S115.

When Pa≠1, there is a possibility for a case in which the previous broadcast call probability was too small, so that the call probability value is increased. Namely, the next broadcast call probability P is determined as P=min (Pa×2, 1), that is the smaller one of Pa×2 and 1 (S115), and the operation returns to the step S102.

The control data indicating the call probability P generated at the control data generation unit 150 in this manner is subsequently broadcast to the terminals 200 by the control data broadcast unit 160 at the step S102 at the next unit time interval.

Next, the basic operation at each terminal 200 side is carried out according to the flow chart of FIG. 12 as follows.

The control data reception unit 210 of the terminal 200 receives the call probability P indicated by the control data broadcast from the center 100 through the broadcast channel 500 (S201).

Then, the random number generation unit 222 of the calling operation command unit 220 obtains the random number R in a range of 0.0<R≦1.0 (S202).

The calling operation command unit 220 then judges whether the received call probability P is greater than or equal to the obtained random number R (S203), and if P≧R, the operation proceeds to the step S204, whereas if P<R, the operation returns to the step S201.

When P≧R, the calling operation command unit 220 issues the call command to the terminal data transmission unit 250, and in response, the terminal data transmission unit 250 tries to connect the line to the center service port by calling up the center 100 (S204).

At this point, the terminal 200 judges whether the center service port is busy or not (S205), and if it is busy, the operation returns to the step S201, whereas if it is not busy, the operation proceeds to the step S206.

When the center service port is not busy, the line is connected in response to the calling from the terminal data transmission unit 250, so that the terminal data transmission unit 250 reads out the terminal data from the terminal data storage unit 240 and transmits the terminal data to the center 100 through the public network 300 (S206).

Then, when the transmission of the terminal data to the center 100 is completed, the data link is disconnected (S207) and the operation is terminated.

It is to be noted that, in the first embodiment described above, the control data for improving the measured center congestion state, i.e., the next broadcast call probability P, is calculated at the center 100, but it is also possible to broadcast the measured center congestion state as it is to each terminal 200, and obtain the next call probability P at each terminal 200 according to the center congestion state broadcast from the center 100 and the number of center service ports notified in advance.

In addition, there may be a case in which the number of terminals which are potentially trying to call up the center 100 changes in time. In such a case, the system can be modified to be adaptive to such a change of the potentially calling terminal number by storing past records of the potentially calling terminal number predicted in each unit time interval, and predicting a time change of the potentially calling terminal number from the stored past records, at the center 100. Here, when a typical pattern of change of the potentially calling terminal number is known empirically, it is also effective to utilize such an empirically known pattern in predicting the time change of the potentially calling terminal number.

Also, in the first embodiment described above, the unit time interval for measuring the number of arrived calls at the center 100 has been predetermined to be a constant time interval, but it is also possible to change the unit time interval adaptively by measuring a distribution of the service times for which the center service ports are occupied in each unit time interval, and setting up a next unit time interval for a next call probability according to the measured distribution of the service times. For example, in a case the service time at each center service port is concentrated in a first half of a given unit time interval, a shorter time interval will be set up as a next unit time interval.

Alternatively, instead of measuring the distribution of the service times at the center service ports, it is also possible to change the unit time interval adaptively by notifying an estimated service time required for transmitting the terminal data from the terminal 200 to the center 100 as soon as the data link between the terminal 200 and the center service port is established. In this case, the center 100 can recognize the required service time before the service is completed. Consequently, it is possible for the center to broadcast the call probability at earlier timing by accounting for the time lag between the broadcast of the call probability from the center 100 and the arrival of the call from the terminal 200 in response to the broadcast call probability.

Also, in a case requiring a long time lag between the broadcast of the call probability from the center 100 and the arrival of the call from the terminal 200 in response to the broadcast call probability, the call probability calculation processing at the center 100 side for counting the number of arrived calls from the terminals 200 in response to the broadcast call probability and determining the next call probability will have a tendency to be delayed. For this reason, there may be a case in which the call probability calculation processing cannot be completed within a short unit time interval set up in advance. In such a case, the potentially calling terminal number at two unit time intervals ahead of now can be predicted according to the past records of the potentially calling terminal number predicted in each unit time interval, at a timing of one unit time interval ahead of now, Then, the center broadcasts the call probability at earlier timing by accounting for that long time lag between the broadcast of the call probability from the center 100 and the arrival of the call from the terminal 200 in response to the broadcast call probability, such that there is an enough time for completing the call probability calculation processing before the end of the short unit time interval set up in advance.

It is to be noted here that this provision of predicting the potentially calling terminal number at two unit time intervals ahead of now obtains the benefit of having an enough time for completing the call probability calculation processing in exchange to the sacrifice of the accuracy of the estimation somewhat, and the trade-off between these two factors should be evaluated in practice to find out a suitably balanced point.

It is also possible to use a provision of predicting the potentially calling terminal number at more than two (such as three) unit time intervals ahead of now in order to obtain even longer time before the end of the short unit time interval set up in advance, and a siutably balanced point for the trade-off betwen the above noted two factors may possibly be found in such a case of predicting the potentially calling terminal number at more than two unit time intervals ahead.

Moreover, in the first embodiment described above, the center service ports are operated most efficiently when each terminal 200 transmits the same amount of terminal data, but in a case some terminal 200 transmits a large terminal data, the unit time interval is going to be set up longer, so that the center service ports other than that which receives this long terminal data will be operated rather inefficiently. However, by setting up the next call probability not from the number of arrived calls at the center 100 and the number of center service ports, but from the number of arrived calls at the center 100 and a number of center service ports in idle state at that moment, it becomes possible to operate the center service ports efficiently even when there exists a terminal which occupies some service port for long time. In other words, in this case, the number of center service ports is going to be regarded as varying in time.

Here, it should be noted that there is a time lag between the broadcast of the call probability from the center 100 and the arrival of the call from the terminal 200 to the center 100 in response to the reception of that broadcast call probability, and if the service for the call occupying one service port is finished during this time lag, this service port will be in an idle state. For this reason, it is possible to operate the center service ports even more efficiently by notifying an estimated service time required for transmitting the terminal data from the terminal 200 to the center 100 as soon as the data link between the terminal 200 and the center service port is established, and regarding those service ports which are currently occupied by the calls but at which the services are expected to be finished within a period of time between the broadcast of the call probability from the center 100 and the arrival of the call from the terminal 200 to the center 100 in response to the reception of that broadcast call probability.

Referring now to FIG. 13 to FIG. 19, the second embodiment of a method and a system for data collection according to the present invention will be described in detail.

Figure 13:
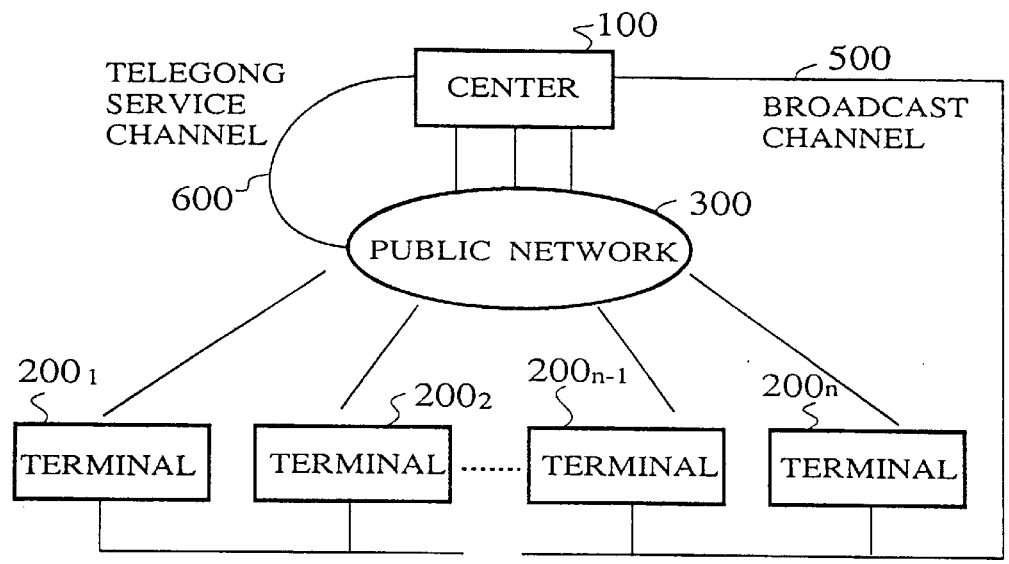
FIG. 13 is a schematic block diagram of the second embodiment of a data collection system according to the present invention.

In this second embodiment, the system has an overall configuration as shown in FIG. 13, which differs from the first embodiment of FIG. 5 in that a telegong service (telephone polling service as presently available in Japan) channel 600 is additionally provided between the center 100 and the public network 300. The rest of the configuration of FIG. 13 is substantially the same as that of FIG. 5 described above.

Here, the telegong service provided by the telegong service channel 600 is the already existing service for counting and notifying a number of calls to a specific telephone number. In this second embodiment, a number of lost calls, i.e., a number of calls which are set in the busy state as a result of overflowing from the center service ports at the center 100 is notified from the public network 300 to the center 100.

Figure 14:
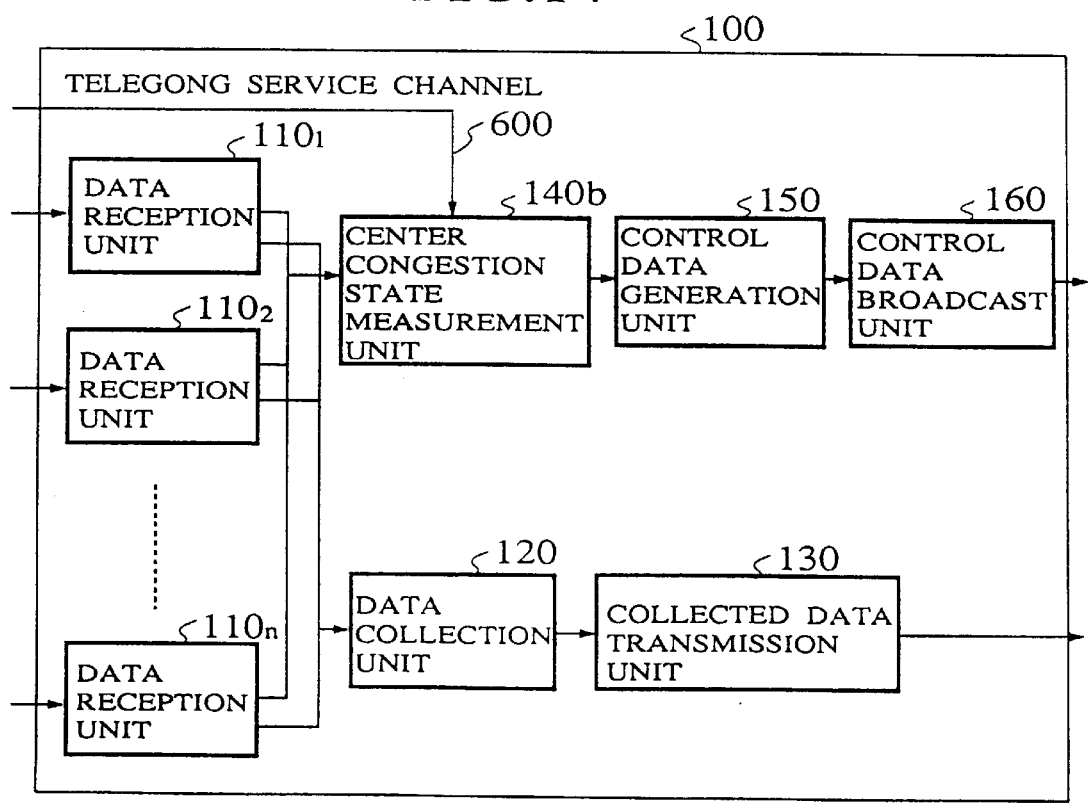
FIG. 14 is a block diagram of a center in the data collection system of FIG. 13.

Here, the center 100 has an internal configuration as shown in FIG. 14, which comprises a plurality of data reception units 110 serving as center service ports connected with the public network 300, a data collection unit 120 connected with the data reception units 110, a collected data transmission unit 130 connected with the data collection unit 120, a center congestion state measurement unit 140b connected with the data reception units 110 and the telegong service channel 600, a control data generation unit 150 connected with the center congestion state measurement unit 140b, and the control data broadcast unit 160 connected with the control data generation unit 150 and the broadcast channel 500.

The data reception units $110_1$ to $110_n$ receive data arriving from the individual terminals 200 through the public network 300, and enter the received data into the data collection unit 120 while notifying the arrival of the received data to the center congestion state measurement unit 140b. The data collection unit 120 collects the data obtained by the data reception units $110_1$ to $110_n$ together as collected data, and enters the collected data into the collected data transmission unit 130. The collected data transmission unit 130 transmits the collected data obtained by the data collection unit 120 to a destination predetermined in the center 100.

The center congestion state measurement unit 140b measures a center congestion state indicated by a total number of arrived calls at the center 100 according to a number of received calls notified from the data reception units 110, while receiving a total number of lost calls notified from the telegong service channel 600. The control data generation unit 150 generates a call probability as the control data according to the center congestion state measured by the center congestion state measurement unit 140b. The control data broadcast unit 160 broadcasts the call probability generated by the control data generation unit 150 as the control data toward an unspecified number of the terminals 200.

Figure 15:
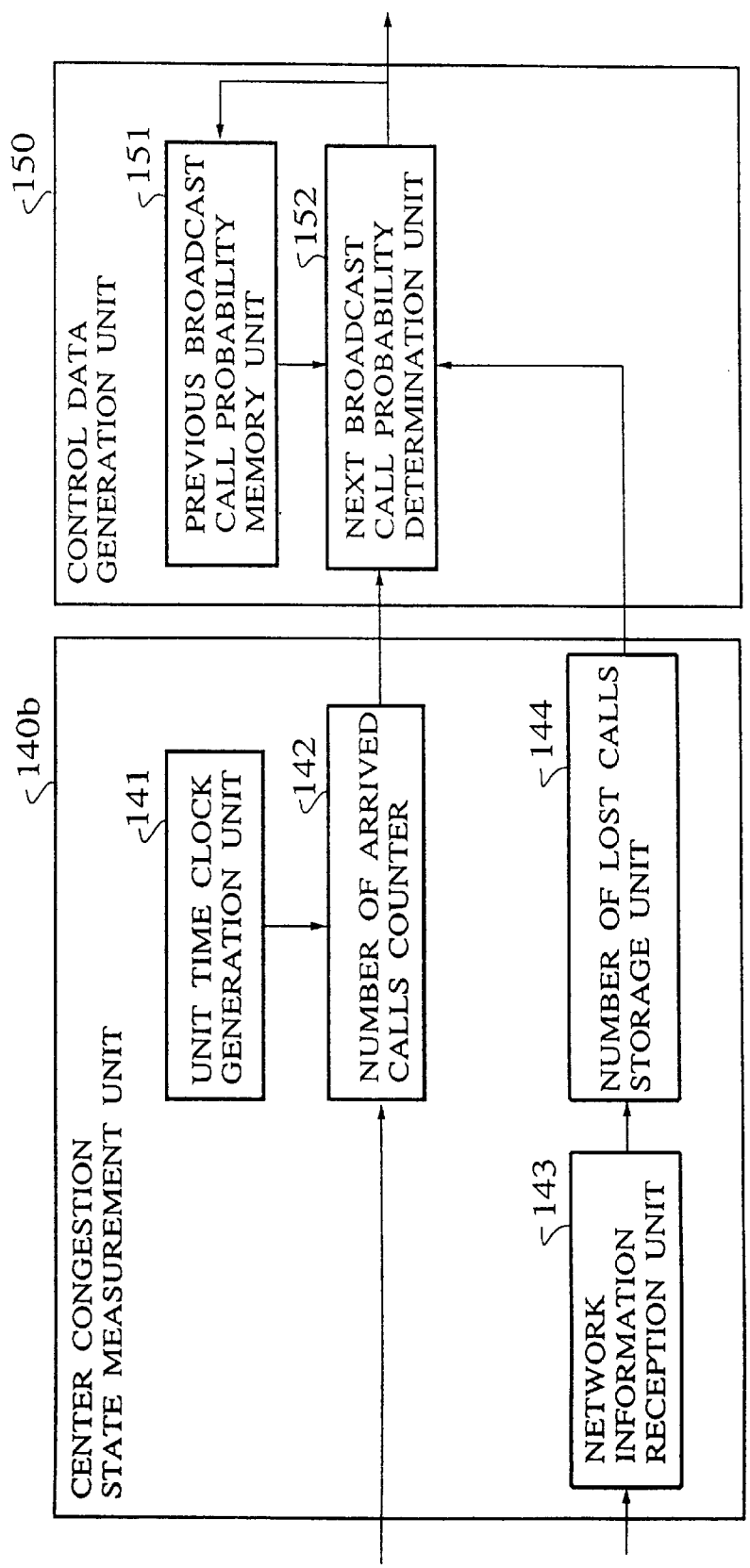
FIG. 15 is a detailed block diagram of a center congestion state measurement unit and a control data generation unit in the center of FIG. 14.
Figure 16:
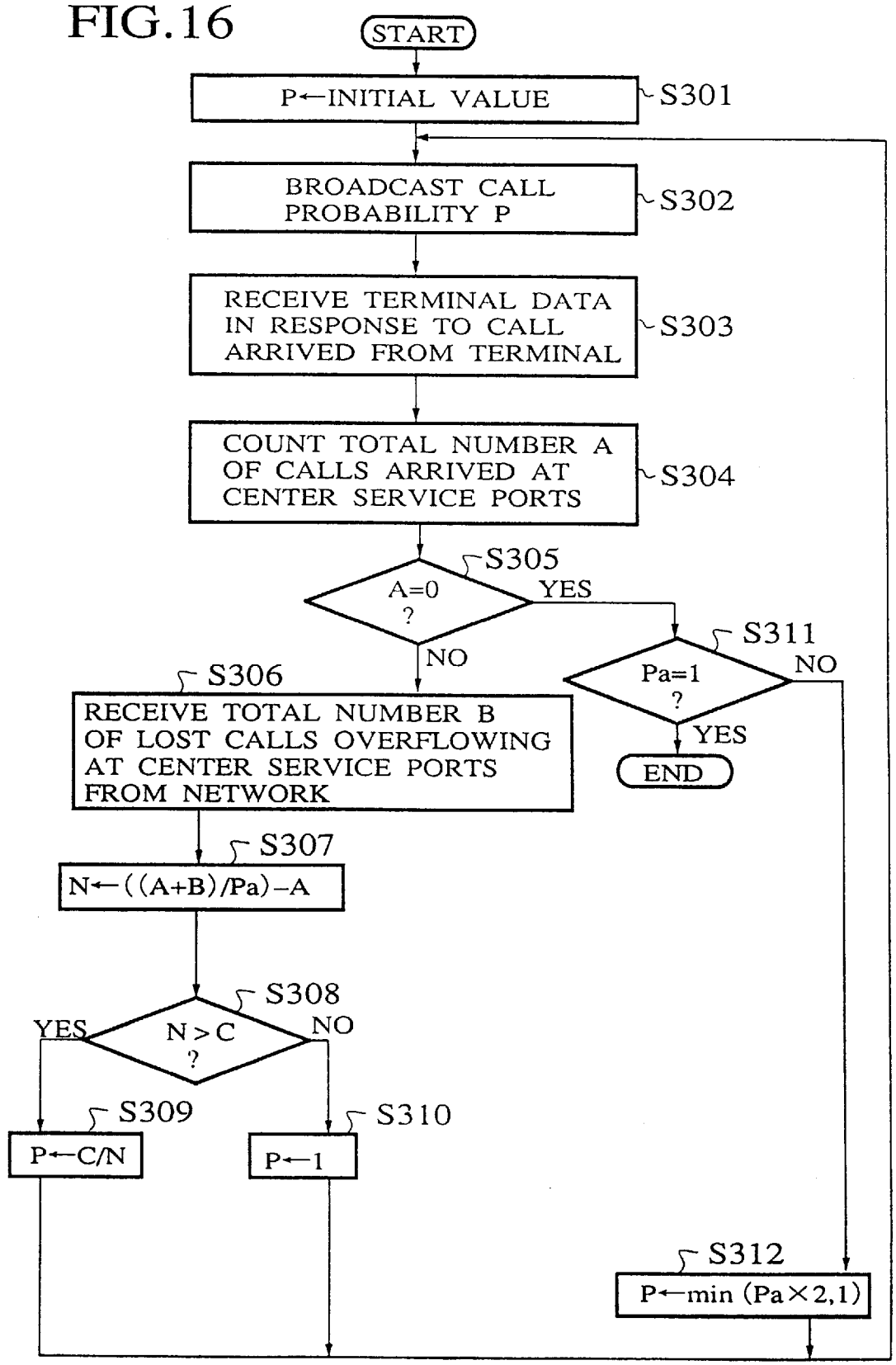
FIG. 16 is a flow chart for a basic operation in the center of FIG. 14.

In the center 100 of FIG. 14, the center congestion state measurement unit 140b and the control data generation unit 150 have internal configurations as shown in FIG. 15, which differ from those of FIG. 8 described above in that the center congestion state measurement unit 140b further includes a network information reception unit 143 for receiving the number of lost calls notified from the telegong service channel 600, and a number of lost calls storage unit 144 connected with the network information reception unit 143 and the next broadcast call probability determination unit 152 for storing the number of lost calls received at the network information reception unit 143.

Here, the unit time clock generation unit 141 and the number of arrived calls counter 142 of the center congestion state measurement unit 140b, and the previous broadcast call probability memory unit 151 of the control data generation unit 150 are substantially the same as in the first embodiment described above.

The next broadcast call probability determination unit 152 of the control data generation unit 150 initially has an initial value of the call probability which is a value sufficiently small such that the arriving calls resulting from this initial value will not exceed the processing capacity of the center service ports. This initial value is used in the initial unit time interval, while the call probability is sequentially updated in the second and subsequent unit time intervals according to the flow chart of FIG. 16 as follows. Here, let a number of arrived calls notified from the number of arrived calls counter 142 be A, a value stored in the previous broadcast call probability memory unit 151 be Pa, a number of lost calls notified from the number of lost calls storage unit 144 be B, and a number of service ports in the center 100 be C.

The control data generation unit 150 sets up the initial value of the call probability P which is a value sufficiently small such that the arriving calls resulting from this initial value will not exceed the processing capacity of the center service ports for the initial unit time interval at the center 100 (S301).

When this call probability P is transferred from the control data generation unit 150 to the control data broadcast unit 160, the control data broadcast unit 160 broadcasts this call probability P as the control data to the terminals 200 through the broadcast channel 500 (S302).

Then, in response to calls arrived from the terminals 200, the data reception units 110 of the center 100 receive the terminal data (S303) and the data collection unit 120 carries out the data collection operation.

Also, the number of arrived calls counter 142 of the center congestion state measurement unit 140b counts the total number A of the calls arrived at the center service ports, and enters the counted total number A of arrived calls into the next broadcast call probability determination unit 152 (S304). Then, this number of arrived calls counter 142 is reset.

Then, the next broadcast call probability determination unit 152 of the control data generation unit 150 judges whether the count value A is equal to 0 or not (S305), and the operation proceeds to the step S306 in a case A≠0, or to the step S311 in a case A=0.

When A≠0, the network information reception unit 143 of the center congestion state measurement unit 140b obtains the number B of lost calls from the public network 300 through the telegong service channel 600, and the obtained number B of lost calls is stored in the number of lost calls storage unit 144 (S306).

Then, the next broadcast call probability determination unit 152 obtains the number B of lost calls from the number of lost calls storage unit 144, and predicts the total number N of the terminals 200 which are potentially trying to call up the center 100 as:

$$N=((A+B)/Pa)-A$$

where Pa is a previous call probability value stored in the previous broadcast call probability memory unit 151 (S307).

Then, the next broadcast call probability determination unit 152 compares the predicted total terminal number N obtained at the step S307 with the number C of the center service ports (S308), and the operation proceeds to the step S309 in a case N>C, or to the step S310 in a case N≦C.

When N>C, the next broadcast call probability determination unit 152 determines the next broadcast call probability P according to the predicted total terminal number N and the number C of the center service ports as P =C/N (S309), and the operation returns to the step S302.

When N<C, the next broadcast call probability determination unit 152 determines the next broadcast call probability P to be P=1 (S310), and the operation returns to the step S102.

On the other hand, when A=0 at the step S305, that is when there is no arrived call, whether the previous broadcast call probability Pa is equal to 1 or not is judged (S311). If Pa=1, it implies that there is no terminal which is trying to call up the center 100, so that the operation is terminated, whereas otherwise the operation proceeds to the step S312.

When Pa≠1, i.e., when A=0 and Pa<1, there is a possibility for a case in which a number of arrived calls A just happens to be 0 as the previous broadcast call probability is too small, so that the control data generation unit 150 determines a larger value for the next broadcast call probability P, and the control data broadcast unit 160 broadcasts this next broadcast call probability P as the control data again.

For example, when the previous broadcast call probability is Pa, the next broadcast call probability is determined as P=Pa×2. Here, however, P is a probability value which should not exceed 1, so that when Pa×2 exceeds 1, the next broadcast call probability is determined as P=1. Namely, the next broadcast call probability P is determined as P=min (Pa×2, 1), that is the smaller one of Pa×2 and 1 (S312), and the operation returns to the step S302.

The control data indicating the call probability P generated at the control data generation unit 150 in this manner is subsequently broadcast to the terminals 200 by the control data broadcast unit 160 at the step S302 at the next unit time interval.

Figure 17:
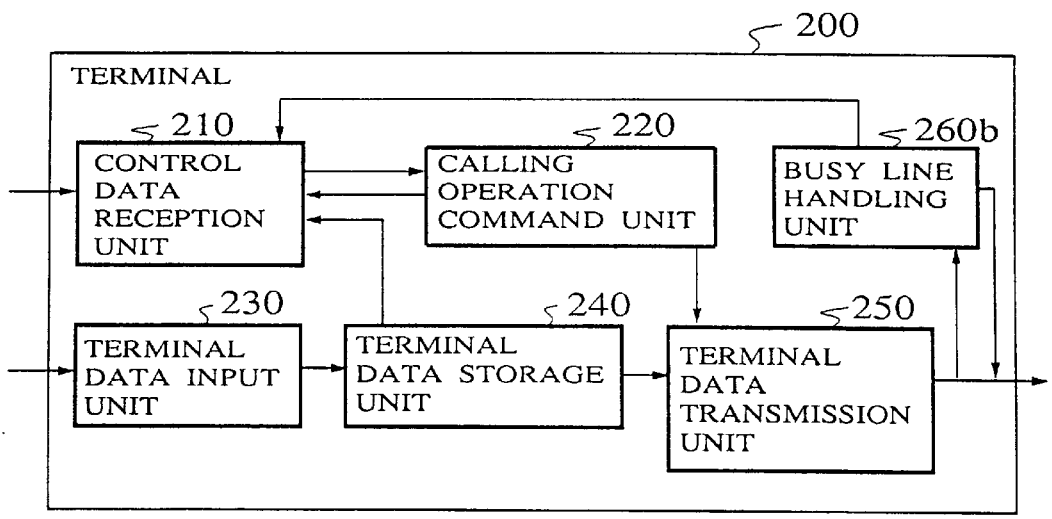
FIG. 17 is a block diagram of a terminal in the data collection system of FIG. 13.

On the other hand, each terminal 200 has an internal configuration as shown in FIG. 17, which differs from that of FIG. 9 described above in that the busy line handling unit 260b shares the communication line of the public network 300 connected to the terminal data transmission unit 250, such that the busy line handling unit 260b not only monitors a state of the communication line connected to the terminal data transmission unit 250 and commands the control data reception unit 210 to restart the reception of the control data when a busy line state is detected in response to the calling from the terminal data transmission unit 250, but also notifies the detection of the busy line state to the telegong service provided in the public network 300, such that the number of lost calls is counted at the public network 300. The rest of the configuration of FIG. 17 is substantially the same as that of FIG. 9 described above.

Figure 18:
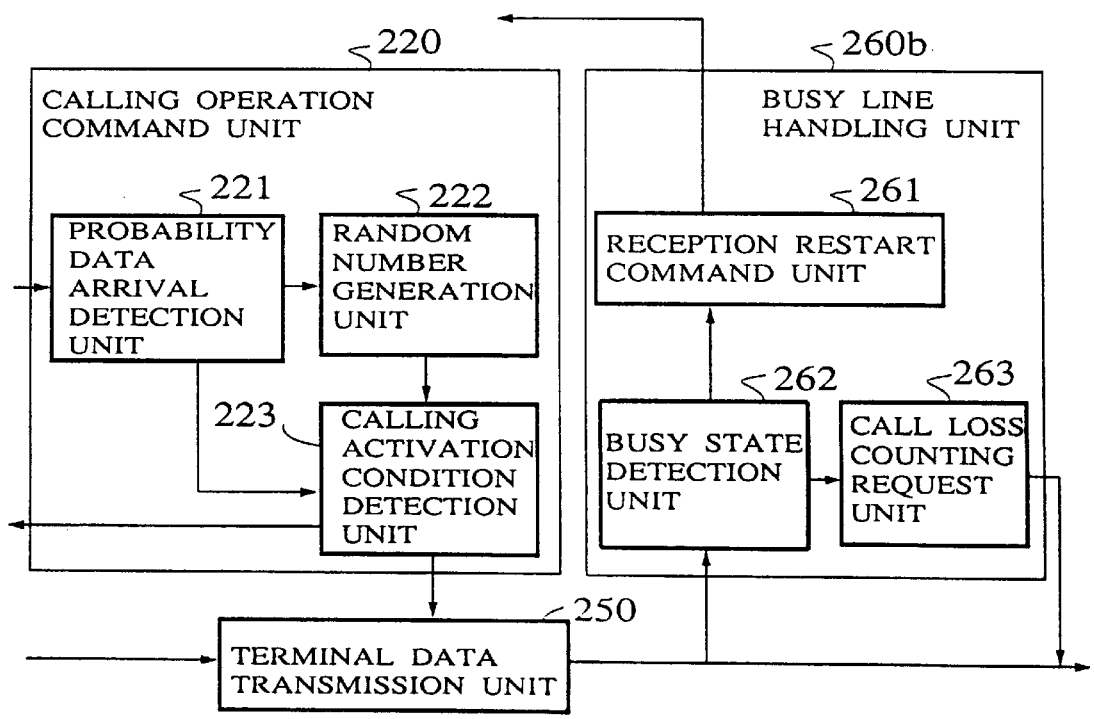
FIG. 18 is a detailed block diagram of a calling operation command unit and a busy line handling unit in the terminal of FIG. 17

In this terminal 200 of FIG. 17, the calling operation command unit 220 and the busy line handling unit 260b have internal configurations as shown in FIG. 18, which differ from those of FIG. 10 described above in that the busy line handling unit 260b further includes a call loss counting request unit 263 connected with the busy state detection unit 262 and the communication line of the public network 300. The busy state detection unit 262 of the busy line handling unit 260b monitors the communication state in the communication line connected to the terminal data transmission unit 250, and when the communication line in the busy state is detected, notifies this to the reception restart command unit 261, while issuing a signal to the call loss counting request unit 263. When this signal is received, the call loss counting unit 263 utilizes the telegong service through the public network 300, and requests the counting of the call losses occurring in the public network 300. In response, the number of lost calls indicating a number of terminals 200 whose calls are set in the busy state is counted by the telegong service provided on the public network 300, and notified to the center 100 through the telegong service channel 600.

Here, the calling operation command unit 220 and the reception restart command unit 261 of the busy line handling unit 260b are substantially the same as in the first embodiment described above.

Figure 19:
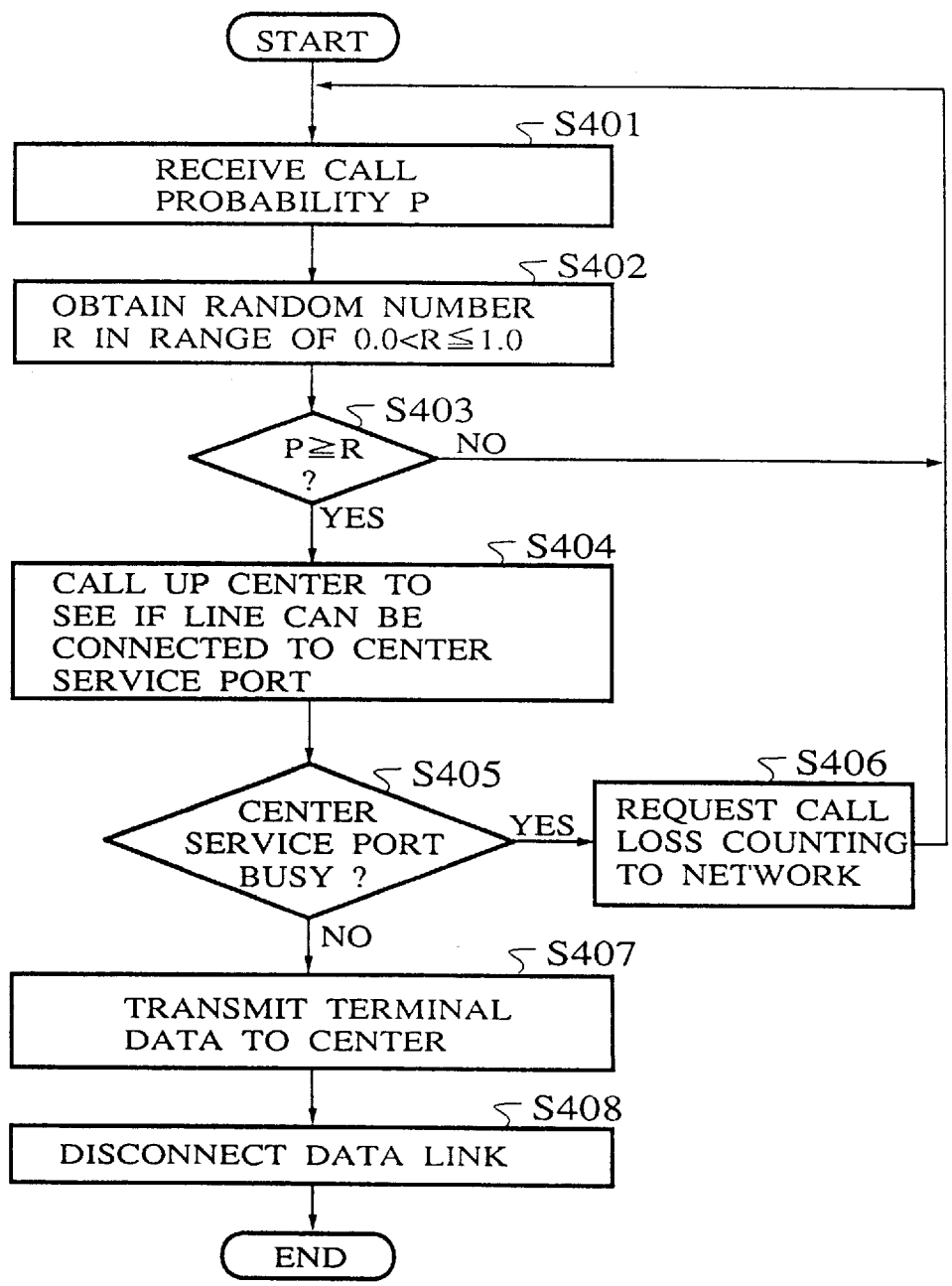
FIG. 19 is a flow chart for a basic operation in the terminal of FIG. 17.

Now, the basic operation at each terminal 200 side in this second embodiment is carried out according to the flow chart of FIG. 19 as follows.

The control data reception unit 210 of the terminal 200 receives the call probability P indicated by the control data broadcast from the center 100 through the broadcast channel 500 (S401), and outputs the received call probability P to the probability data arrival detection unit 221 of the calling operation command unit 220.

Then, the probability data arrival detection unit 221 notifies the detection of the arrival of the call probability P to the random number generation unit 222 and the calling activation condition detection unit 223. In response, the random number generation unit 222 of the calling operation command unit 220 obtains the random number R in a range of $0.0 < R \leq 1.0$ (S402), and enters the generated random number R into the calling activation condition detection unit 223.

The calling activation condition detection unit 223 then judges whether the received call probability P is greater than or equal to the obtained random number R (S403), and if $P \geq R$, the operation proceeds to the step S404, whereas if $P < R$, the operation returns to the step S401.

When $P \geq R$, the calling activation condition detection unit 223 issues the call command to the terminal data transmission unit 250, and in response, the terminal data transmission unit 250 tries to connect the line to the center service port by calling up the center 100 (S404).

At this point, the busy state detection unit 262 of the busy line handling unit 260b judges whether the center service port is busy or not (S405), and if it is busy, the operation proceeds to the step S406, whereas if it is not busy, the operation proceeds to the step S407.

When the center service port is busy, the call loss counting request unit 263 of the busy line handling unit 260b requests the counting of call losses to the public network 300 by utilizing the telegong service (S406).

When the center service port is not busy, the line is connected in response to the calling from the terminal data transmission unit 250, so that the terminal data transmission unit 250 reads out the terminal data from the terminal data storage unit 240 and transmits the terminal data to the center 100 through the public network 300 (S407).

Then, when the transmission of the terminal data to the center 100 is completed, the data link is disconnected (S408) and the operation is terminated.

It is to be noted that the telegong service in general also provides a service called cut through in which a part of counted calls is connected to the center service ports at a prescribed rate while counting the number of calls. Consequently, instead of carrying out the operation for trying to set up a connection to the center 100 at the terminal data transmission unit 250 and the operation for requesting the counting of call losses at a time of the busy state detection at the call loss counting request unit 263 independently, it is also possible to achieve the same effect by trying to set up a connection to the center 100 by means of the cut through of the telegong service, while counting a number of calls that are connected and a number of calls that are not connected by means of the telegong service.

It is also to be noted that the data collection system described above has been assumed to cause no congestion due to the reason stemming from the system itself in principle. However, there are cases in which this system gets involved in the congestion caused by another totally independent system. For this reason, the second embodiment described above can be modified as follows. Namely, in addition to the information on a number of lost calls which are overflowing from the center service ports in this system, the comprehensive congestion information including the congestion state of the network caused by the other systems can also be received from the network, such that the occurrence of the congestion can be avoided by suppressing the broadcast call probability low whenever the network is put in a likely to be congested state by the other system.

In summary, the present invention concerns with a scheme for collecting data from an unspecified number of many terminals to a center having a plurality of service ports, in which the congestion state at the center is measured, and the center and the terminals are controlled to operate cooperatively such that the center congestion state can be improved.

Figure 20:
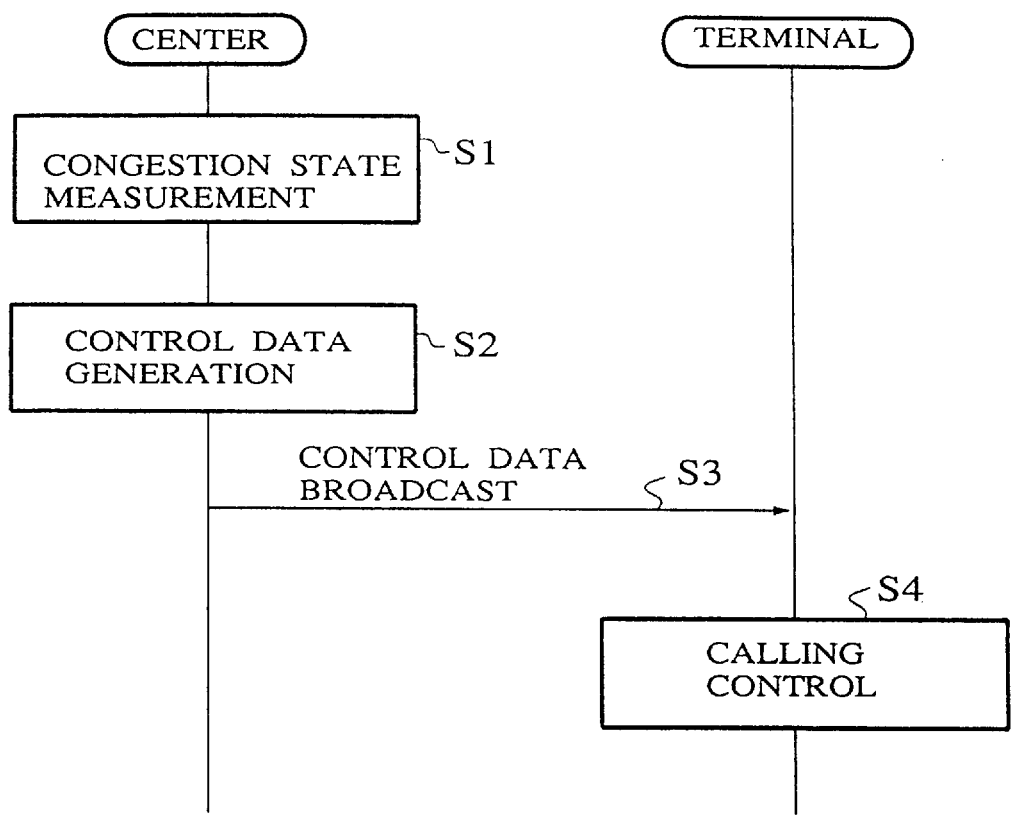
FIG. 20 is a sequence chart summarizing essential features of the data collection scheme according to the present invention.

In essence, the present invention functions according to the sequence chart of FIG. 20 as follows.

Namely, the congestion state of the center is measured (S1), and the control data for improving the measured center congestion state is generated (S2). Then, the generated control data is broadcast toward an unspecified number of many terminals (S3) such that the terminal which received the control data carries out the calling or recalling operation according to the received control data (S4).

Here, the center congestion state can be measured in terms of a number of calls arrived at the center service ports, and the control data can be a call probability for adjusting a total number of terminals for calling next and their timings for calling according to the measured number of arrived calls.

Figure 21:
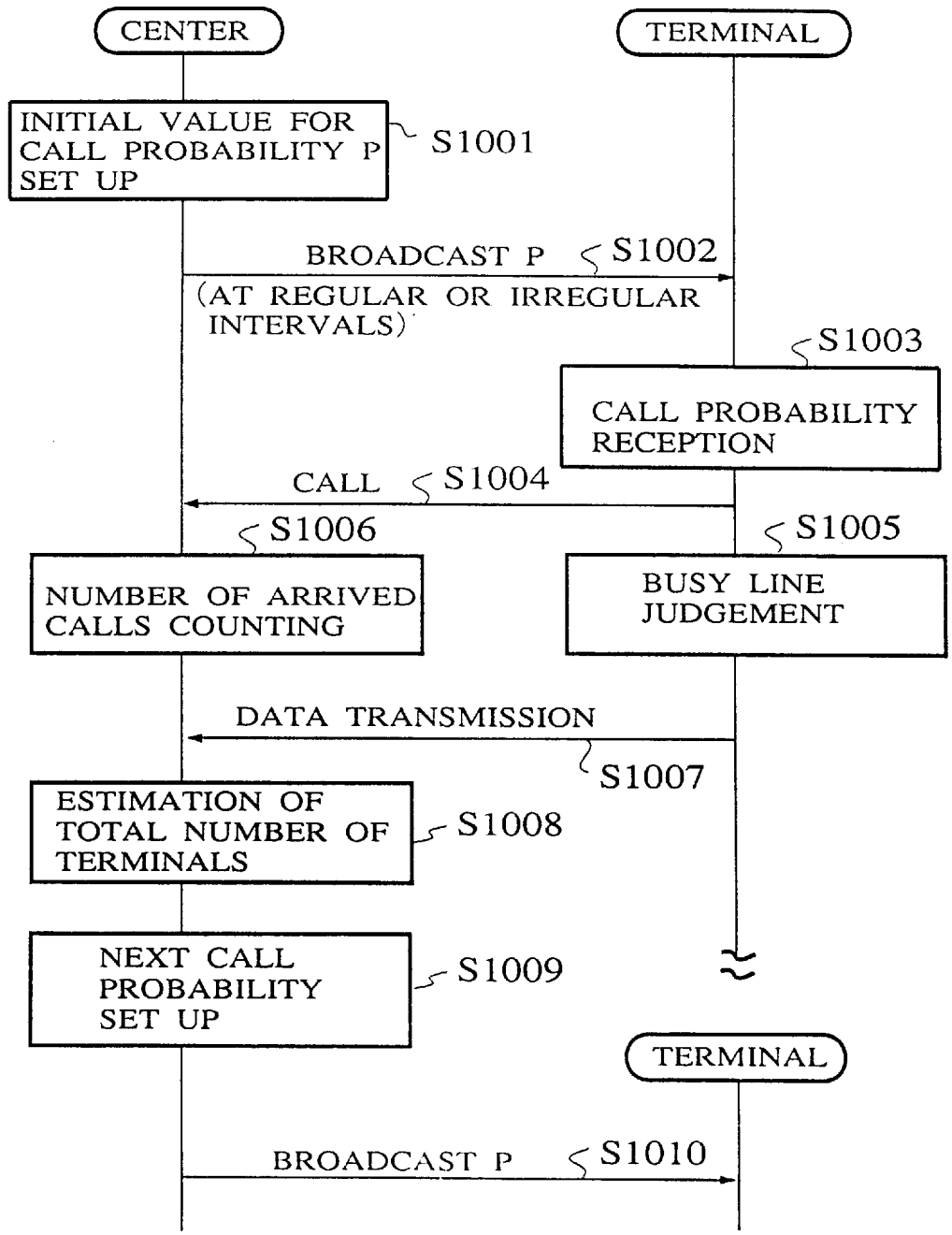
FIG. 21 is a sequence chart showing essential features in the first embodiment of the data collection scheme according to the present invention.

In further detail, one embodiment of the present invention functions in essence according to the sequence chart of FIG. 21 as follows.

The center sets up the initial value for the call probability P as the control data to be broadcast (S1001), and this call probability P is intermittently broadcast to the terminals at regular or irregular time intervals (S1002), such that each terminal receives the call probability broadcast from the center (S1003). Then, each terminal determines whether or not to call according to the received call probability, and awaits for a reception of the next call probability in a case of not calling, or calls up the center to see if the line can be connected to the center service port (S1004). Then, each terminal judges whether the line is busy or not (S1005), and awaits for a reception of the next call probability in a case the line is busy, or transmits the terminal data to the center in a case the line is connected (S1007). Meanwhile, as the calls from the terminals arrive, the center counts a number of calls actually arrived at the center service ports within a prescribed period of time (S1006) while receiving the terminal data transmitted from the terminals. Then, the center estimates a total number of terminals which are potentially trying to call up the center according to the counted number of actually arrived calls and the previously broadcast call probability (S1008), and sets up the next broadcast call probability according to the estimated total number of calling terminals and a prescribed number of center service ports provided at the center (S1009) which is subsequently broadcast to the terminals (S1010).

Figure 22:
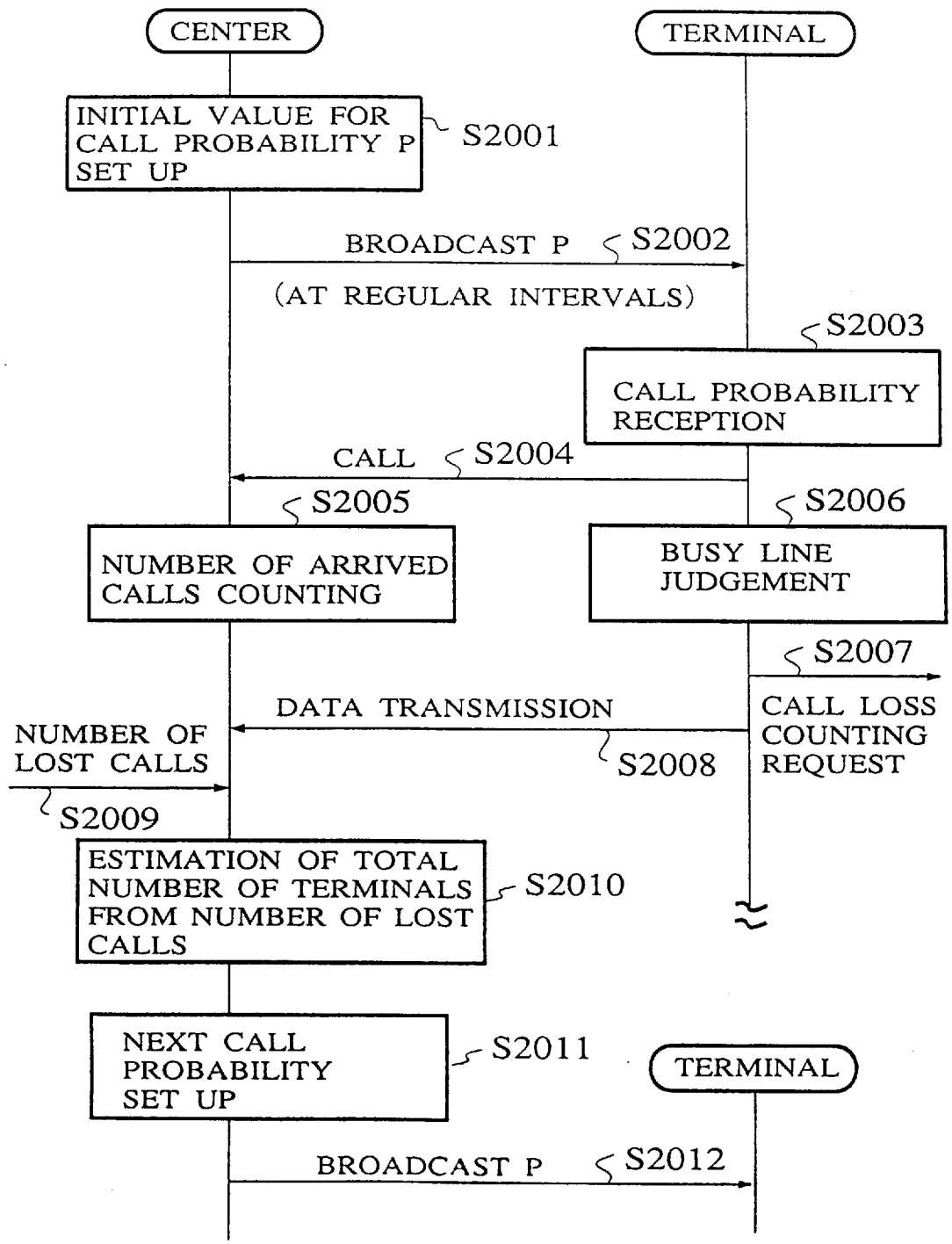
FIG. 22 is a sequence chart showing essential features in the second embodiment of the data collection scheme according to the present invention.

Also, another embodiment of the present invention functions in essence according to the sequence chart of FIG. 22 as follows.

The center sets up the initial value for the call probability P as the control data to be broadcast (S2001), and this call probability P is intermittently broadcast to the terminals at regular time intervals (S2002), such that each terminal receives the call probability broadcast from the center (S2003). Then, each terminal determines whether or not to call according to the received call probability, and awaits for a reception of the next call probability in a case of not calling, or calls up the center to see if the line can be connected to the center service port (S2004). Then, each terminal judges whether the line is busy or not (S2006), and requests a counting of call losses to the public network in a case the line is busy (2007), or transmits the terminal data to the center in a case the line is connected (S2008). Meanwhile, as the calls from the terminals arrive, the center counts a number of calls actually arrived at the center service ports within a prescribed period of time (S2005) while receiving the terminal data transmitted from the terminals. Then, when the number of lost calls overflowing from the center service ports is received from the public network (S2009), the center estimates a total number of terminals which are potentially trying to call up the center according to the estimated number of lost calls, the counted number of actually arrived calls, and the previously broadcast call probability (S2010), and sets up the next broadcast call probability according to the estimated total number of calling terminals and a prescribed number of center service ports provided at the center (S2011) which is subsequently broadcast to the terminals (S2012).

Also, the present invention provides a system for collecting data from an unspecified number of many terminals to a center having a plurality of service ports, which measures the congestion state at the center, and controls the center and the terminals to operate cooperatively such that the center congestion state can be improved.

Figure 23:
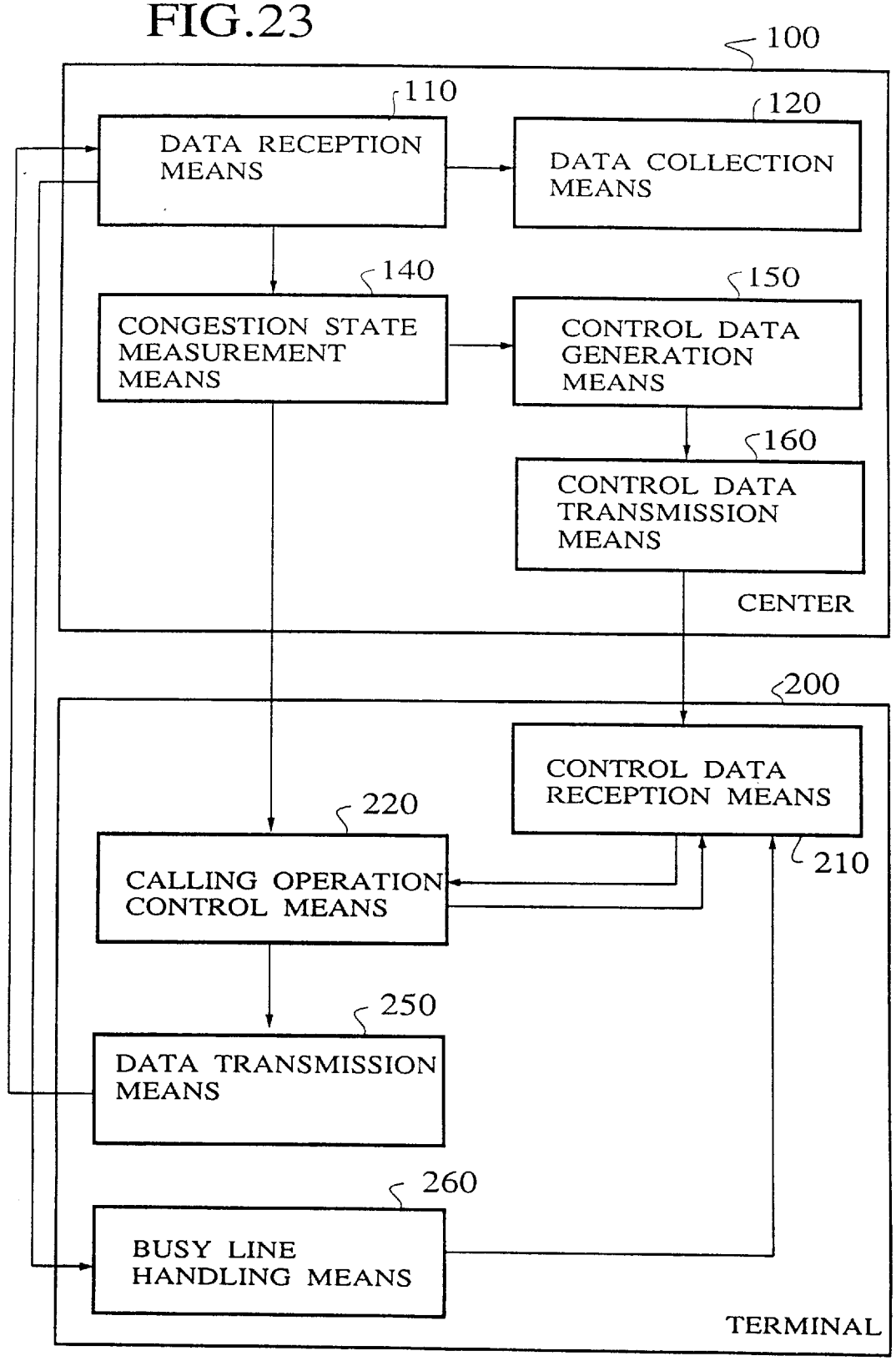
FIG. 23 is a block diagram showing essential features in the data collection system according to the present invention.

In further detail, the data collection system of the present invention has a basic configuration as shown in FIG. 23, which comprises: a center 100 including a data reception means 110 for receiving the terminal data in response to the arrivals of calls from the terminals to the center service ports, a data collection means 120 for collecting the terminal data received by the data reception means as one collected data, a center congestion state measurement means 140 for measuring a congestion state of the center service ports, a control data generation means 150 for generating the control data from an information on the center congestion state measured by the center congestion state measurement means 140, and a control data transmission means 160 for broadcasting the control data to an unspecified number of many terminals at regular or irregular time intervals; and a plurality of terminals 200, each of which including a control data reception means 210 for receiving the control data broadcast from the center 100, a calling operation control means 220 for controlling the calling operation according to the control data received by the control data reception means 210, a data transmission means 250 for connecting a line with the center service port and transmitting the terminal data, and the busy line handling means 260 for controlling the calling operation when the center service port is busy.

As described, according to the present invention, an amount of calls from an unspecified number of many terminals is controlled in accordance with the processing capacity of the center service ports, so that it is possible to utilize the center service ports fully, while minimizing the call loss processing which exerts an extra processing load on the network.

When the center service ports are fully utilized while the processing load on the network is reduced, the network can concentrate on the call connection processing related to the data collection, so that the data collection time can be shortened. Thus, if the same number of data are to be collected, the data can be collected faster, and if the same amount of time is to be used, more data can be collected.

In particular, by using the call probability as the control data to be broadcast from the center to the terminals, it is possible to estimate a total number of terminals which are potentially trying to call the center from a number of calls actually arrived at the center and the broadcast call probability, when the processing capacity of the center service ports is not utilized to the limit. By means of this, the call probability can be quickly adjusted higher to such a value for realizing the amount of calls by which the center service ports can be fully utilized without exerting an extra processing load on the network.

Also, by obtaining an information on an amount of lost call overflowing from the center service ports, it is also possible to estimate a total number of terminals which are potentially trying to call the center even when the center service ports are full, such that the call probability can be quickly adjusted lower to such a value for realizing the amount of calls by which the center service ports can be fully utilized while reducing an extra processing load on the network.

Thus, the data collection system of the present invention is particularly useful in a case in which it is difficult to estimate in advance a size of demands from an unspecified number of many terminals which are trying to call the center. Also, the data collection system of the present invention can easily deal with a case in which the a number of terminals which are potentially trying to call the center changes in time.

It is to be noted that, besides a case of dealing with an unspecified number of many terminals, even in a case of dealing with a specified number of many terminals, there are cases in which it is inappropriate to request the data transmission from the center side to the individual terminal by inquiring, or by polling for selectively assigning the idle channel, such as a case in which the network does not provide a sufficient facility for calling from the center side to the terminal side, and a case in which the network provides only a system for charging fees to the calling side. In such cases, it is necessary to make a call from the terminal side, so that the application of the present invention can be similarly effective.

It is also to be noted that there are cases in which the processing for admitting arriving calls at the center service ports require a heavier processing load that the processing for transmitting and receiving data. In such a case, it may be necessary to disperse the call arrival timings such that the processing for admitting arriving calls can keep up with the processing for transmitting and receiving data. To this end, it is possible to transmit a unit wait time U and a waiting group number G along with the call probability P in the control data, such that at a time of calling from each terminal, a random integer number R in a range of 0 to G−1 is generated and the calling operation is carried out after awaiting for a period of time R×U.

It is also possible to modify the above described embodiments such that the center is divided into a plurality of call admission centers for admitting calls from the terminals and a control center for counting a total number of arrived calls at the call admission centers, generating the call probability P according to the counted total number of arrived calls, and transmitting the control data indicating the generated call probability P and a total number L of the call admission centers, such that at a time of calling from each terminal, a random integer number R in a range of 0 to L−1 is generated and the calling operation is carried out with respect to one of the call admission centers identified by the generated random integer number R. In this case, a list of the public network addresses (telephone numbers) of the call admission centers is notified to each terminal through the broadcast channel in advance.

It is also to be noted that, according to the present invention, it is also possible to quickly estimate an entire scale of the terminals which are potentially trying to call the center, from a total number of calls made in response to the broadcast call probability, without actually counting all the terminals, so that the present invention can be utilized for the purpose of such an estimation.

It is also to be noted that the present invention basically provides an end-to-end control between the center and the terminals, both of which are not particularly distinguished users from the viewpoint of the public network, so that there is a little dependency on a type of the public network used. In the present invention, the public network is basically required to provide a function for connecting a call from the terminal to the center. Then, if this public network happens to provide an additional function for counting call losses, it becomes possible to make the system even more efficient as described above.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for collecting data from many terminals to a center having a plurality of center service ports through a public network, the method comprising the steps of:

transmitting terminal data from the terminals to the center through the public network by carrying out a calling operation to call up the center at each terminal;

collecting the terminal data received at the center service ports;

measuring a congestion state of the center service ports;

generating a control data for controlling the calling operation at each terminal such that the congestion state measured at the measuring step is improved, the control data indicating a call probability by which the calling operation at each terminal is carried out probabilistically;

broadcasting the control data generated at the generating step from the center to the terminals; and controlling the calling operation at each terminal according to the control data broadcast at the broadcasting step, by determining whether or not to carry out the calling operation at each terminal by generating a random number and comparing the random number with the call probability indicated by the control data.

2. The method of claim 1, wherein the measuring step measures the congestion state by counting a number of calls arrived at the center service ports within a prescribed unit time interval.

3. The method of claim 1, wherein the generating step generates the control data for adjusting at least one of a total number of those terminals which call the center, and timings at which said those terminals call the center.

4. The method of claim 1, wherein the transmitting step, the measuring step, the generating step, the broadcasting step, and the controlling step are repeated such that the measuring step measures a number of calls arrived at the center service ports in response to a previous call probability previously broadcast at the broadcasting step, the generating step generates the control data indicating a next call probability to be broadcast next at the broadcasting step by estimating a total number of terminals which are potentially trying to call the center.

5. The method of claim 4, wherein the generating step estimates the total number of terminals according to the previous call probability and the number of calls measured by the measuring step in response to the previous call probability.

6. The method of claim 4, further comprising the step of storing past records of the total number of terminals estimated by the generating step, and wherein the generating step estimates the total number of terminals according to the past records stored by the storing step.

7. The method of claim 4, further comprising the step of storing past records of the total number of terminals estimated by the generating step, and wherein the generating step determines the next call probability by estimating the total number of terminals at more than one timings ahead of a next timing for broadcasting the control data according to the past records stored by the storing step.

8. The method of claim 4, wherein the generating step generates the control data by setting the next call probability according to the estimated total number of terminals and a predetermined number of the center service ports.

9. The method of claim 8, further comprising the step of receiving a report on a number of lost calls overflowing from the center service ports from the public network at the center, and wherein the generating step generates the control data by setting the next call probability also according to the number of lost calls reported from the public network.

10. The method of claim 9, further comprising the step of requesting the public network to count the number of lost calls overflowing from the center service ports, from each terminal when a call made by the calling operation at each terminal resulted in a busy state.

11. The method of claim 4, wherein the generating step generates the control data by setting the next call probability according to the estimated total number of terminals and a number of idle center service ports.

12. The method of claim 11, wherein the generating step estimates the number of idle center service ports by including those center service ports which are expected to be disconnected from the terminals because data transmissions from the terminals are expected to be finished before the calls in response to the next call probability are expected to arrive at the center service ports.

13. The method of claim 12, further comprising the step of notifying an estimated service time required for a data transmission, from each terminal, when a call from each terminal is connected, such that the generating step estimates the number of idle center service ports according to the estimated service time notified from each terminal.

14. The method of claim 11, further comprising the step of receiving a report on a number of lost calls overflowing from the center service ports from the public network at the center, and wherein the generating step generates the control data by setting the next call probability also according to the number of lost calls reported from the public network.

15. The method of claim 14, further comprising the step of requesting the public network to count the number of lost calls overflowing from the center service ports, from each terminal when a call made by the calling operation at each terminal resulted in a busy state.

16. The method of claim 1, further comprising the step of receiving a report on a congestion state of the public network from the public network at the center, and wherein the generating step generates the control data for reducing an amount of calls from the terminals to the center through the public network when the report on the congestion state of the public network indicates that the public network is expected to be congested.

17. The method of claim 1, further comprising the step of adaptively determining a time interval for broadcasting the control data at the broadcasting step according to a distribution of service times for which the center service ports are occupied by the calls from the terminals within a prescribed unit time interval.

18. The method of claim 17, further comprising the step of notifying an estimated service time required for a data transmission from each terminal when a call from each terminal is connected, such that the adaptively determining step estimates the distribution of service times from the estimated service time notified at the notifying step.

19. The method of claim 1, wherein the generating step generates the control data indicating a unit wait time U and a waiting group number G, and the controlling step controls the calling operation at each terminal by generating a random number R in a range of 0 to G−1, and carrying out the calling operation after awaiting for a period of time R×U.

20. The method of claim 1, wherein the center includes a plurality of call admission centers, and the generating step generates the control data indicating a total number L of the call admission centers, and the controlling step controls the calling operation at each terminal by generating a random integer number R in a range of 0 to L−1, and carrying out the calling operation with respect to one of the call admission centers identified by the random integer number R.

21. The method of claim 1, wherein each terminal transmits the terminal data at the transmitting step when a call is connected to one of the center service ports as a result of the calling operation, and awaits for a reception of a next control data when a call is not connected to one of the center service ports as a result of the calling operation.

22. The method of claim 1, wherein the generating step generates the control data such that a total number of those terminals which call the center in response to the control data approaches to a total number of the center service ports when a number of calls arrived at the center service ports within a prescribed unit time interval is less than the total number of the center service ports.

23. The method of claim 1, wherein the generating step generates the control data such that a total number of those terminals which call the center in response to the control data decreases when a number of calls arrived at the center service ports within a prescribed unit time interval is greater than or equal to the total number of the center service ports.

24. A system for collecting data from many terminals to a center having a plurality of center service ports through a public network, the system comprising:

means for transmitting terminal data from the terminals to the center through the public network by carrying out a calling operation to call up the center at each terminal;

means for collecting the terminal data received at the center service ports;

means for measuring a congestion state of the center service ports;

means for generating a control data for controlling the calling operation at each terminal such that the congestion state measured by the measuring means is improved, the control data indicating a call probability by which the calling operation at each terminal is carried out probabilistically;

means for broadcasting the control data generated by the generating means from the center to the terminals; and means for controlling the calling operation at each terminal according to the control data broadcast by the broadcasting means, by determining whether or not to carry out the calling operation at each terminal by generating a random number, and comparing the random number with the call probability indicated by the control data.

25. The system of claim 24, wherein the measuring means measures the congestion state by counting a number of calls arrived at the center service ports within a prescribed unit time interval.

26. The system of claim 24, wherein the generating means generates the control data for adjusting at least one of a total number of calling terminals which call the center, and timings at which said calling terminals call the center.

27. The system of claim 24, wherein the transmitting means, the measuring means, the generating means, the broadcasting means, and the controlling means are operated repeatedly such that the measuring means measures a number of calls arrived at the center service ports in response to a previous call probability previously broadcast by the broadcasting means, the generating means generates the control data indicating a next call probability to be broadcast next by the broadcasting means by estimating a total number of terminals which are potentially trying to call the center.

28. The system of claim 27, wherein the generating means estimates the total number of terminals according to the previous call probability and the number of calls measured by the measuring means in response to the previous call probability.

29. The system of claim 27, further comprising means for storing past records of the total number of terminals estimated by the generating means, and wherein the generating means estimates the total number of terminals according to the past records stored by the storing means.

30. The system of claim 27, further comprising means for storing past records of the total number of terminals estimated by the generating means, and wherein the generating means determines the next call probability by estimating the total number of terminals at more than one timings ahead of a next timing for broadcasting the control data according to the past records stored by the storing means.

31. The system of claim 27, wherein the generating means generates the control data by setting the next call probability according to the estimated total number of terminals and a predetermined number of the center service ports.

32. The system of claim 31, further comprising means for receiving a report on a number of lost calls overflowing from the center service ports from the public network at the center, and wherein the generating means generates the control data by setting the next call probability also according to the number of lost calls reported from the public network.

33. The system of claim 32, further comprising means for requesting the public network to count the number of lost calls overflowing from the center service ports, from each terminal when a call made by the calling operation at each terminal resulted in a busy state.

34. The system of claim 27, wherein the generating means generates the control data by setting the next call probability according to the estimated total number of terminals and a number of idle center service ports.

35. The system of claim 34, wherein the generating means estimates the number of idle center service ports by including those center service ports which are expected to be disconnected from the terminals because data transmissions from the terminals are expected to be finished before the calls in response to the next call probability are expected to arrive at the center service ports.

36. The system of claim 35, further comprising means for notifying an estimated service time required for a data transmission, from each terminal, when a call from each terminal is connected, such that the generating means estimates the number of idle center service ports according to the estimated service time notified from each terminal.

37. The system of claim 34, further comprising means for receiving a report on a number of lost calls overflowing from the center service ports from the public network at the center, and wherein the generating means generates the control data by setting the next call probability also according to the number of lost calls reported from the public network.

38. The system of claim 37, further comprising means for requesting the public network to count the number of lost calls overflowing from the center service ports, from each terminal when a call made by the calling operation at each terminal resulted in a busy state.

39. The system of claim 24, further comprising means for receiving a report on a congestion state of the public network from the piblic network at the center, and wherein the generating means generates the control data for reducing an amount of calls from the terminals to the center through the public network when the report on the congestion state of the public network indicates that the public network is expected to be congested.

40. The system of claim 24, further comprising means for adaptively determining a time interval for broadcasting the control data by the broadcasting means according to a distribution of service times for which the center service ports are occupied by the calls from the terminals within a prescribed unit time interval.

41. The system of claim 40, further comprising means for notifying an estimated service time required for a data transmission from each terminal when a call from each terminal is connected, such that the adaptively determining means estimates the distribution of service times from the estimated service time notified by the notifying means.

42. The system of claim 24, wherein the generating means generates the control data indicating a unit wait time U and a waiting group number G, and the controlling means controls the calling operation at each terminal by generating a random number R in a range of 0 to G−1, and carrying out the calling operation after awaiting for a period of time R×U.

43. The system of claim 24, wherein the center includes a plurality of call admission centers, and the generating means generates the control data indicating a total number L of the call admission centers, and the controlling means controls the calling operation at each terminal by generating a random integer number R in a range of 0 to L−1, and carrying out the calling operation with respect to one of the call admission centers identified by the random integer number R.

44. The system of claim 24, wherein each terminal transmits the terminal data by the transmitting means when a call is connected to one of the center service ports as a result of the calling operation, and awaits for a reception of a next control data when a call is not connected to one of the center service ports as a result of the calling operation.

45. The system of claim 24, wherein the generating means generates the control data such that a total number of those terminals which call the center in response to the control data approaches to a total number of the center service ports when a number of calls arrived at the center service ports within a prescribed unit time interval is less than the total number of the center service ports.

46. The system of claim 24, wherein the generating means generates the control data such that a total number of those terminals which call the center in response to the control data decreases when a number of calls arrived at the center service ports within a prescribed unit time interval is greater than or equal to the total number of the center service ports.

47. A terminal device in a system for collecting data from many terminals to a center having a plurality of center service ports through a public network, the terminal device comprising:

control data receiving means for receiving a control data for controlling a calling operation to call up the center at the terminal device broadcast from the center, the control data indicating a call probability by which the calling operation at the terminal device is carried out probabilistically;

calling operation control means for determining whether or not to carry out the calling operation according to the control data received by the control data receiving means, by generating a random number and comparing the random number with the call probability indicated by the control data;

data transmission means for transmitting terminal data through the public network to one of the center service ports by carrying out the calling operation when the calling operation control means determines to carry out the calling operation; and busy line handling means for restarting a probabilistic execution of the calling operation by restarting a reception of the call probability at the control data receiving means when a call made by the calling operation resulted in a busy state.

48. A terminal device in a system for collecting data from many terminals to a center having a plurality of center service ports through a public network, the terminal device comprising:

control data receiving means for receiving a control data for controlling a calling operation to call up the center at the terminal device broadcast from the center, the control data indicating a call probability by which the calling operation at the terminal device is carried out probabilistically;

calling operation control means for determining whether or not to carry out the calling operation according to the call probability received by the control data receiving means, by generating a random number and comparing the random number with the call probability indicated by the control data;

data transmission means for transmitting terminal data through the public network to one of the center service ports by carrying out the calling operation when the calling operation control means determines to carry out the calling operation; and busy line handling means for restarting a probabilistic execution of the calling operation by restarting a reception of the call probability at the control data receiving means, while requesting the public network to count a number of lost calls overflowing at the center service ports, when a call made by the calling operation resulted in a busy state.

49. A center device in a system for collecting data from many terminals to a center having a plurality of center service ports through a public network, the center device comprising:

data reception means for receiving terminal data from the terminals in response to arrivals of calls from the terminals to the center service ports;

data collection means for collecting the terminal data received by the data reception means;

congestion state measurement means for measuring a congestion state of the center service ports;

control data generation means for generating a control data for controlling a calling operation at each terminal such that the congestion state measured by the congestion state measurement means is improved, the control data indicating a call probability by which the calling operation at each terminal is carried out probabilistically; and control data broadcast means for broadcasting the control data generated by the control data generation means to the terminals, such that whether or not to carry out the calling operation is determined at each terminal by generating a random number and comparing the random number with the call probability indicated by the control data.

50. A center device in a system for collecting data from many terminals to a center having a plurality of center service ports through a public network, the center device comprising:

data reception means for receiving terminal data from the terminals in response to arrivals of calls from the terminals to the center service ports;

data collection means for collecting the terminal data received by the data reception means;

congestion state measurement means for measuring a congestion state of the center service ports, and obtaining a number of lost calls overflowing from the center service ports from the public network;

control data generation means for generating a control data for controlling a calling operation at each terminal such that the congestion state measured by the congestion state measurement means is improved while the number of lost calls obtained by the congestion state measurement means is reduced, the control data indicating a call probability by which the calling operation at each terminal is carried out probabilistically; and control data broadcast means for broadcasting the control data generated by the control data generation means to the terminals, such that whether or not to carry out the calling operation is determined at each terminal by generating a random number and comparing the random number with the call probability indicated by the control data.

* * * * *

UNITED STATES PATENT AND TRADEMARK OFFICE

CERTIFICATE OF CORRECTION

PATENT NO.: 5,859,899

DATED: January 12, 1999

INVENTOR(S): Sakai, et al.

It is certified that error appears in the above-identified patent and that said Letters Patent is hereby corrected as shown below:

Column 25, line 46 reads "the piblic network" and should read ---the public network---

Signed and Sealed this

Fourteenth Day of December, 1999

Attest:

Q. TODD DICKINSON

*Attesting Officer*       *Acting Commissioner of Patents and Trademarks*